United States Patent
King

(10) Patent No.: US 12,315,032 B2
(45) Date of Patent: *May 27, 2025

(54) MULTI-CORE DRAW SPLITTING

(71) Applicant: Imagination Technologies Limited, Kings Langley (GB)

(72) Inventor: Ian King, Hertfordshire (GB)

(73) Assignee: Imagination Technologies Limited, Kings Langley (GB)

(*) Notice: Subject to any disclaimer, the term of this patent is extended or adjusted under 35 U.S.C. 154(b) by 0 days.

This patent is subject to a terminal disclaimer.

(21) Appl. No.: 18/439,730

(22) Filed: Feb. 12, 2024

(65) Prior Publication Data

US 2024/0185376 A1 Jun. 6, 2024

Related U.S. Application Data

(63) Continuation of application No. 18/126,332, filed on Mar. 24, 2023, now Pat. No. 11,900,503.

(30) Foreign Application Priority Data

Mar. 30, 2022 (GB) .................................. 2204509

(51) Int. Cl.
- *G06T 1/20* (2006.01)
- *G06T 1/60* (2006.01)
- *G06T 15/00* (2011.01)

(52) U.S. Cl.
CPC ................. *G06T 1/20* (2013.01); *G06T 1/60* (2013.01); *G06T 15/005* (2013.01)

(58) Field of Classification Search
CPC ........... G06T 1/20; G06T 1/60; G06T 15/005; G06T 2210/52
USPC .................................................. 345/501, 505
See application file for complete search history.

(56) References Cited

U.S. PATENT DOCUMENTS

| | | |
|---|---|---|
| 8,074,224 B1 | 12/2011 | Nordquist et al. |
| 10,275,851 B1 | 4/2019 | Zhao et al. |
| 2007/0091099 A1 | 4/2007 | Zhang et al. |
| 2011/0109638 A1 | 5/2011 | Duluk, Jr. et al. |
| 2015/0254102 A1 | 9/2015 | Ueda et al. |
| 2017/0236244 A1 | 8/2017 | Price et al. |
| 2018/0211435 A1 | 7/2018 | Nijasure et al. |
| 2019/0355084 A1 | 11/2019 | Gierach et al. |
| 2021/0097013 A1 | 4/2021 | Saleh et al. |
| 2021/0241416 A1 | 8/2021 | Cerny |
| 2022/0083384 A1 | 5/2022 | Cerny |
| 2022/0319089 A1 | 10/2022 | Nemlekar et al. |

FOREIGN PATENT DOCUMENTS

WO 2009/068895 A1 6/2009

*Primary Examiner* — Jacinta M Crawford
(74) *Attorney, Agent, or Firm* — Potomac Law Group, PLLC; Vincent M DeLuca

(57) ABSTRACT

A multicore graphics processing unit (GPU) and a method of operating a GPU are provided. The GPU comprises at least a first core and a second core. At least one of the cores in the multicore GPU comprises a master unit configured to distribute geometry processing tasks between at least the first core and the second core.

20 Claims, 9 Drawing Sheets

MULTI-CORE DRAW SPLITTING

CROSS REFERENCE TO RELATED APPLICATIONS AND CLAIM OF PRIORITY

This application is a continuation under 35 U.S.C. 120 of copending application Ser. No. 18/126,332 filed Mar. 24, 2023, now U.S. Pat. No. 11,900,503, which claims foreign priority under 35 U.S.C. 119 from United Kingdom Application No. 2204509.0 filed Mar. 30, 2022, the contents of which are incorporated by reference herein in their entirety.

BACKGROUND

In computer graphics, "rendering" is the process of converting a 3D model, describing a virtual scene, into one or more 2D images, representing a view of the scene from a specific viewpoint (or viewpoints). As this is a computationally intensive process, for typical virtual scenes, it is common to provide a hardware accelerator that is specialised in carrying out the necessary computations. This kind of hardware accelerator is known in the art as a graphics processing unit (GPU).

Different GPUs may have different hardware architectures, reflecting different strategies for carrying out the computations necessary for 3D rendering. One exemplary GPU uses a "tile-based deferred rendering" pipeline.

This approach separates the rendering process into two distinct stages. One of these two stages—the geometry processing stage (or simply geometry stage, for short)—involves processing geometry data that describes the 3-D model of the scene. The geometry data is transformed from the 3-D space into the 2-D coordinates of the image, based on the particular viewpoint to be rendered. The output of this stage is transformed geometry, which is stored in a "parameter buffer".

The fundamental operation in the geometry stage is to work out what primitive shapes fall within each tile. The primitives are most commonly triangles. These triangles join together to form objects. The triangles are described in terms of their vertices (corner points). Each vertex includes positional information (the location of the vertex) and can include additional information, for example, colour. The vertex information is stored in a vertex buffer. The location of each vertex in the buffer is its index number. In other words, the indices are pointers to the respective vertices. A list of the indices may be stored in an index buffer. Two associated vertices (or indices) form a line primitive. Associating three vertices (or indices) forms a triangle primitive. Depending on the circumstances, it may be more efficient to read and parse indices instead of vertices when creating primitives, as the indices are smaller (in memory).

The geometry stage of a rendering operation begins when the GPU receives a draw call from an application driver. The draw call contains instructions for geometry processing tasks (in particular, what triangles to draw) and all of the information needed to carry out the geometry processing. In some cases, the draw call includes the base address of the index buffer. The indices contained in the index buffer point to the vertices in the vertex buffer. In other cases, there is no index buffer and the draw call includes the base address of the vertex buffer. The draw call also defines additional information needed to interpret the indices or vertices—such as topology information. The topology defines how the indices or vertices are to be interpreted—for example, whether they define individual triangles, three vertices at a time, or a "strip" of triangles, in which each index adds a new triangle to the end of the strip.

In order to reduce rendering time, it is desirable to process rendering tasks, including geometry processing tasks, in parallel using a multicore GPU.

SUMMARY

In order to process a draw call in parallel, the rendering tasks contained within the draw call must be split up into smaller groups of tasks that can be processed on each core of the multicore system. In one exemplary solution according to a comparative example, the splitting of the draw call could be performed by a central hub connected to each core in the multicore system by a dedicated communications link.

The rendering tasks contained within the draw call cannot be split in an arbitrary way. In order to construct all triangles properly and avoid rendering errors, each triangle must have three vertices. A partial triangle of one or two vertices will not be rendered and the final image will contain an error. As mentioned above, it is more efficient to work in terms of indices instead of vertices when creating primitives. In a simple four core example, a draw call may specify that eight triangles are to be drawn. If each triangle is specified by three unique vertices/indices, then splitting the draw call could be as simple as providing each core with six indices so that it can draw two triangles. However, this is often not the case. In general, the eight triangles may be specified by fewer than twenty-four unique indices because some triangles will be connected (sharing one or more vertices, as in the case of the triangle strip mentioned above). For this reason, further information is required, in order to determine how many indices should be provided to each core.

In order to properly split a draw call, the topology information contained within the draw call can be used to group indices together into triangle primitives. Using the topology information, a central hub could split rendering tasks such that it keeps each primitive intact, preventing the creation of any incomplete triangles and accounting for any shared indices.

In the exemplary comparative example discussed above, the central hub is intended to function with otherwise standalone GPU cores that are designed to be capable of operating independently (separately from each other, and with or without the central hub). For this reason, the cores in communication with the central hub are configured to receive draw calls directly from the application driver, meaning that they are only capable of receiving information in index format, not primitive format. However, as explained above, in order to properly split the tasks contained in the draw call, the central hub must convert from index format to primitive format. For this reason, the central hub needs to convert from index to primitive format, split the draw calls and then convert back into index format before sending tasks to the cores.

A multicore graphics processing unit (GPU) and a method of operating a GPU are provided. The GPU comprises at least a first core and a second core. At least one of the cores in the multicore GPU comprises a master unit configured to distribute geometry processing tasks between at least the first core and the second core.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

According to one aspect, there is provided a method of distributing a set of geometry processing tasks in a graphics processing unit comprising a plurality of cores, the method comprising:

receiving, by a master unit in one of the plurality of cores, the set of geometry processing tasks, wherein the set of geometry processing tasks comprises:
   an indication of a set of elements in an element buffer; and
   topology information, wherein the topology information defines the semantics of the element buffer;
grouping, by the master unit and based on the topology information, the elements into primitives;
splitting, by the master unit, the set of geometry processing tasks into at least a first trigger and a second trigger, wherein the first trigger comprises an indication of a first starting primitive in the element buffer and an instruction to render a first number of primitives starting from the first starting primitive, and the second trigger comprises an indication of a second starting primitive in the element buffer and an instruction to render a second number of primitives starting from the second starting primitive;
assigning, by the master unit, the first trigger to a first core of the plurality of cores;
assigning, by the master unit, the second trigger to a second core of the plurality of cores;
sending, by the master unit, the first trigger to the first core; and
sending, by the master unit, the second trigger to the second core.

Primitives, also known as geometric primitives, are shapes that combine to form objects within a scene. The most basic primitive shapes include triangles (defined by three vertices) and lines (defined by two vertices). Depending on the object being rendered, a set of primitives may be discontinuous in space, sharing no vertices; or may share one or more vertices with other primitives, such as in a triangle strip or triangle fan.

The vertices that define a set of primitives are stored in a vertex buffer. Each vertex includes location information, indicating where it is located in a scene, and often contains additionally information about its appearance (for example, colour and opacity). In some examples, an index buffer is associated with the vertex buffer. The index buffer contains a list of indices, each index pointing to a location of a vertex in the vertex buffer.

The grouping of vertices into primitives can be done by reading and parsing the vertices themselves, or by reading and parsing the indices referencing those vertices. In other words, either the vertices or the indices may be grouped. Where each vertex includes a large amount of information, it can be inefficient to read and parse the vertices directly. In these cases, it may be preferable to instead read and parse the indices representing the vertices. This may reduce memory bandwidth requirements, because each index simply points to a vertex, and does not include additional information like vertex appearance. However, when each vertex does not contain a large amount of information, it may be more efficient to perform the geometry processing tasks without using indices (for example, because the indirection associated with the index buffer has some overhead in terms of memory access latency and/or memory occupancy).

The terms "element" and "element buffer" used herein are used to encompass a vertex and a vertex buffer, as well as an index and an index buffer, respectively.

It is not possible to tell from a list of elements, alone, which elements combine to form primitives. By extension, it is also unclear whether any of the primitives share elements. For example, four elements ABCD making up part of an element buffer could represent three triangles arranged in a triangle fan (triangles ABC, ACD and ADB), or two triangles in a triangle strip (triangles ABC and BCD). However, in order to properly split geometry processing tasks, the master unit needs to be able to correctly identify the primitives defined in the element buffer so that it can identify starting primitives and determine numbers of primitives to be rendered. Similarly, the cores processing the triggers need to be able to find their starting primitives in the element buffer and correctly find the next primitives for processing.

To enable this, topology information is sent to the master unit with the geometry processing tasks. The topology information defines the semantics of the element buffer, meaning that it tells the master unit how to read the element buffer. For example, the topology information could define the element buffer as:

a triangle list, in which each primitive is described by three elements;
a triangle strip, in which each primitive other than the starting primitive is made of two elements from the previous primitive, plus one new element;
a triangle fan, in which each primitive is made of one shared central element, another element from the previous primitive and a new leading edge element.

In a complete triangle fan, the leading edge element of the final primitive may be one of the (non-central) elements of the starting primitive of the triangle fan. In other words, the topology information defines the configuration of primitives in the element buffer.

Using the topology information, the master unit can group the elements in the element buffer into primitives. Grouping the elements may mean associating elements with each other. With the elements grouped, the master unit splits the geometry processing tasks into a first trigger and a second trigger. The splitting may involve identifying starting primitives for each trigger and a number of primitives to render starting with the starting primitive The topology information may also be sent to the cores by the master unit, or otherwise made available to the cores. For example, the topology information may be represented by an identification number that can be sent to the cores by the master unit. The cores may use the topology information to associate elements in the element buffer into primitives, so that each core processes the correct primitives. For example, consider a core provided with a first trigger indicating that the core is to process three primitives in an element buffer comprising elements ABCDEFGHI, and that the core is to start the processing from the first primitive in the buffer. The core can use the topology information to determine whether the element buffer is of the triangle list type, in which case it should render triangles ABC, DEF and GHI; or a triangle strip, in which case it should render triangles ABC, BCD and CDE.

The sum of the first and second number of primitives may be less than the total number of primitives in the set of geometry processing tasks. In other words, the master unit may split additional triggers out of the set of geometry processing tasks. More generally, the number of primitives allocated, at any given time, to all cores of the plurality of cores may be less than the total number of primitives.

Each trigger may be a reference to a contiguous set of primitives within the element buffer. The splitting may create the first trigger and the second trigger concurrently. Alternatively, the set of tasks may be split in a serial fashion, such that the first and second triggers are created at different times.

The first core may process the first trigger, and the second core may process the second trigger. The processing of the triggers may comprise transforming 3D coordinates of the primitives in a scene to 2D coordinates of an image of the scene, and projecting the primitives onto the 2D image (for example, by changing the sizes of the primitives to account for depth).

In some examples, the set of geometry processing tasks may also comprise an indication of the number of elements in the element buffer. In some other examples, the master unit may determine the number of elements in the element buffer. To enable this, the element buffer may include a termination marker that indicates the final element in the buffer.

The first core may comprise a slave unit, a first processing unit and a second processing unit, and the method may further comprise: receiving, by the slave unit of the first core, the first trigger; splitting, by the slave unit of the first core, the first trigger into at least a third trigger and a fourth trigger; sending, by the slave unit of the first core, the third trigger to the first processing unit; sending, by the slave unit of the first core, the fourth trigger to the second processing unit; processing, by the first processing unit, the third trigger; and processing, by the second processing unit, the fourth trigger. The third trigger may comprise an indication of a third starting primitive in the element buffer and an instruction to render a third number of primitives starting from the third starting primitive. Similarly, the fourth trigger may comprise an indication of a fourth starting primitive in the element buffer and an instruction to render a fourth number of primitives starting from the fourth starting primitive.

The slave unit of the first core may receive the first trigger directly from the core comprising the master unit. Alternatively, another hardware unit in the first core may receive the first trigger and forward it to the slave unit of the first core.

The slave unit of the first core may perform a second level of splitting that enables it to distribute geometry tasks between the processing units of that core. The splitting performed by the slave unit may be performed in the same way as the splitting performed by the master unit.

The splitting performed by the slave unit may enable the processing units of the first core to process tasks in parallel, in the same way that the splitting performed by the master unit enables the cores to process tasks in parallel. This can contribute to reducing the overall processing time for a set of tasks. Additionally, the splitting performed by the slave unit may be useful where the first and second numbers of primitives to be processed are larger than the buffering capacity of a processing unit. In such cases, the triggers may be split into smaller subsets of primitives that are better suited to the buffering capacity of the processing units.

The sum of the third and fourth numbers is less than or equal to the first number. In other words, the first trigger may be split into two or more triggers. The third starting primitive may be the same as the first starting primitive.

The second core may also comprise a slave unit and one or more processing units. The second core may comprise two processing units, and the slave unit of the second core may split the second trigger in the same way as is described for the first core.

In some examples, the first and second cores might not comprise processing units. Rather, the slave units may comprise processing hardware for processing the draw triggers.

The slave unit of the first core may split the first trigger if the first number of primitives is greater than a threshold.

The threshold may be the buffer size of one of the processing units. The slave unit of the first core may determine whether the number of primitives in the first trigger is greater than the threshold.

In a similar way, the master unit might only split the set of geometry processing tasks when the number of primitives in the element buffer is greater than a master splitting threshold.

The splitting by the slave unit of the first core may comprise: generating by the slave unit a first local interleave marker associated with the third trigger; generating by the slave unit a second local interleave marker associated with the fourth trigger; sending by the slave unit, to the first processing unit, the first local interleave marker; and sending by the slave unit, to the second processing unit, the second local interleave marker. The first and second local interleave markers may define an ordering of the third and fourth triggers within the set of geometry processing tasks.

In image rendering systems, an application typically provides the GPU with a list of tasks in a specific order. To properly render the image, these tasks should be processed by the GPU in that order. However, in a multi-core system this order may be violated if, for example, one core or processing unit processes its tasks more quickly than another.

In order to ensure the integrity of the final image, the outputs of the geometry processing tasks should be combined such that they preserve the order of the originally submitted tasks. In order to achieve this, interleave markers may be associated with the triggers. The interleave markers can indicate how the outputs of the triggers should be combined to recover the original order of the tasks.

Within a trigger, the tasks retain their original order. However, when a trigger is split, that order can be violated as was described above. Local interleave markers may be generated by the slave units when they split triggers, to enable the outputs of the split triggers to be recombined such that they preserve the original order of the tasks.

The element buffer may be associated with an instance number defining a number of times that the primitives in the element buffer are to be rendered. When the first core has finished processing the final primitive in the element buffer, if the instance just processed is less than the instance number, the core may continue processing the first trigger from the first primitive in the element buffer.

In graphics processing it is common that certain objects (and by extension, their constituent primitives) appear more than once in a scene. The number of times an object appears in a scene is its instance number. Rather than transmitting multiple draw triggers to the various cores to create multiple instances of one or more primitives, or duplicating a primitive or primitives in the element buffer, it is faster and requires less memory to instead transmit a single trigger representing a single instance that is accompanied by an instance number. The instance number indicates the number of times that the trigger (and, by extension, the primitive(s) in the trigger) need to be processed. Based on the instance number, the first core can process the trigger the multiple times to create multiple instances of the primitives, without requiring much data to be sent to the first core by the master unit.

In some examples, the element buffer may comprise the instance number. In other examples, the instance number may be distinct from the element buffer, but associated with it. In some examples, the set of geometry processing tasks sent to the master unit will comprise an indication of the instance number.

The method may further comprise: determining, by the master unit, a number of primitives-per-instance in the element buffer based on the topology information, wherein the number of primitives-per-instance is the number of complete primitives in the element buffer; sending by the master unit, to at least the first core, the number of primitives-per-instance in the element buffer; detecting, by the first core, based on the first starting primitive and the number of primitives-per-instance, when the first core has processed the final primitive in the element buffer; and continuing, by the first core, to process the first trigger starting from the first primitive in the element buffer.

In this way, the first core can avoid processing dangling elements. Dangling elements are elements in the element buffer that do not form complete primitives. For example, in a triangle list element buffer that contains two primitives, there could be eight elements. In triangle list format, two triangles are represented by six elements. Therefore, the final two elements in the buffer do not form a complete triangle primitive and are dangling elements. By determining when the core has processed the final complete primitive in the element buffer, the core can simply ignore these elements.

The core may determine when it has processed the final complete primitive in the element buffer by subtracting the number of the starting primitive from the number of primitives-per-instance. When this number of primitives has been processed, the core has reached the final complete primitive in the element buffer and can continue processing from the first primitive in the element buffer. When starting/continuing processing from the first primitive in the element buffer, the core can again detect when it has processed the final complete primitive in the buffer, and if there are still primitives to be processed it can again continue processing from the first primitive in the buffer.

The element buffer may be associated with an instance number defining a number of times the primitives in the element buffer are to be rendered. The instance number may be at least two. The first trigger may comprise first primitives of a first instance of the element buffer. The second trigger may comprise second primitives of the first instance of the element buffer, and may further comprise primitives of a second instance of the element buffer.

The first and second triggers may instruct the processing of different primitives. Where the first and second triggers relate to the same instance of the element buffer, they may instruct the processing of different primitives in that instance of the element buffer. In other words, the master unit may split the processing of multiple instances of an element buffer into different triggers. For example, where the element buffer contains four primitives (primitives 1-4 in the buffer) that make up an object with an instance number of three, the master unit may split from the set of tasks: a first trigger comprising an instruction to start at primitive 1 and process three primitives; and a second trigger comprising an instruction to start at primitive 4 and process nine primitives. The first trigger instructs the processing of a part of the first instance of the object, and the second trigger instructs the processing of the remaining part of the first instance of the object, and a second and third instance of the object.

The set of geometry processing tasks may further comprise state information. The splitting of the set of geometry processing tasks by the master unit may comprise splitting the set of geometry processing tasks into the first trigger, the second trigger and the state information. The method may further comprise: sending, by the master unit, the state information to the first core; and sending, by the master unit, the state information to the second core.

The master unit may send the state information to all of the cores in the graphics processing unit, or at least to all of the cores that are configured to perform geometry processing tasks. In some examples, the master unit may send the state information only to the cores to which a trigger has been assigned.

The state information is constant for all of the tasks in the set of geometry processing tasks. In some examples, for a core to processes any of the tasks in the set of geometry processing tasks, that core requires the state information. An example of state information is the topology information, which applies to the entire element buffer and therefore is relevant for all of geometry processing tasks.

The state information may be sent separately from the first and second trigger. Moreover, for a set of geometry processing tasks, the state information may be sent to the first and second cores (and optionally to each core) only once, irrespective of the number of draw triggers that are split from the set of geometry processing tasks and sent to each core. In other words, although the master unit may transmit multiple draw triggers to a core, it will only transmit the state information to that core once.

The splitting of the set of geometry processing tasks may comprise: generating by the master unit a first global interleave marker associated with the first trigger; generating by the master unit a second global interleave marker associated with the second trigger; sending by the master unit, to the first core, the first global interleave marker; and sending by the master unit, to the second core, the second global interleave marker. The global interleave markers may define an ordering of the first and second triggers within the set of geometry processing task.

As explained above, the order in which geometry processing tasks are processed should be the same as the order in which they were submitted by the application. However, this cannot be guaranteed when the tasks are processed in parallel. Instead, the outputs of the tasks may be combined to recover the original order of the tasks.

When splitting the set of geometry processing tasks into triggers, the master unit may generate global markers that indicate the order in which the triggers should be recombined to recover the original submission order of the set of tasks. For example, in addition to the first trigger, the master unit can send a global marker of 1 to the first core. The master unit can send a global marker of 2 to the second core in addition to the second trigger. When the first and second triggers have been processed, their outputs can be recombined based on their global markers. In this example, the outputs of the first trigger would precede the outputs of the second trigger because the first trigger has a smaller global marker number.

In some examples, a global marker may be associated with multiple triggers. For example, the master unit may split a set of geometry processing tasks into ten triggers. Triggers 1-5 may be associated with a global marker of 1 and sent to the first core, while triggers 6-10 may be associated with a global marker of 2 and sent to the second core.

A global interleave marker may further be associated with a plurality of local interleave markers. The local markers may be to the global markers what the global markers are to the set of geometry processing tasks, in that the local markers indicate how the outputs of a set of triggers split from a parent trigger should be combined in order to preserve the original order of the tasks in that parent trigger.

The first core and the second core may be connected by a register bus configured to carry register write commands. Sending the first trigger may comprise outputting, by the master unit, a first register write command that is addressed to the first core and that comprises an indication of the first trigger. Sending the second trigger may comprise outputting, by the master unit, a second register write command that is addressed to the second core and that comprises an indication of the second trigger.

The first and second register write commands may contain the first and second triggers respectively. The master unit may output the register write command directly to the register bus, or to another hardware unit in the core in which the master unit resides, and that interfaces with the register bus.

The first core may comprise the master unit. In other words, the first core may be the core comprising the master unit, and may assign the first trigger to itself and send the first trigger to its own slave unit.

The plurality of cores may comprise a third core. The third core may comprise a slave unit and the master unit. The splitting of the set of geometry processing tasks by the master unit may comprise splitting the set of geometry processing tasks into the first trigger, the second trigger and a fifth trigger. The master unit may assign the fifth trigger to the third core, and send the fifth trigger to the slave unit of the third core. The third core may comprise one or more processing units, which may process the fifth trigger.

The element buffer may be an index buffer, and each element of the element buffer may be an index in the index buffer. Each index in the index buffer may indicate the location of a vertex in a vertex buffer.

The element buffer may be a vertex buffer, and each element of the element buffer may be a vertex in the vertex buffer.

Also provided is a graphics processing unit comprising a plurality of cores, wherein one of the plurality of cores comprises a master unit configured to:
  receive a set of geometry processing tasks comprising:
    an indication of a set of elements in an element buffer; and
    topology information, wherein the topology information defines the semantics of the element buffer;
  group the elements in the element buffer into primitives based on the topology information;
  split the set of geometry processing tasks into at least a first trigger and a second trigger, wherein the first trigger comprises an indication of a first starting primitive in the element buffer and an instruction to render a first number of primitives starting from the first starting primitive, and the second trigger comprises an indication of a second starting primitive in the element buffer and an instruction to render a second number of primitives starting from the second starting primitive;
  assign the first trigger to a first core of the plurality of cores;
  assign the second trigger to a second core of the plurality of cores;
  send the first trigger to the first core; and
  send the second trigger to the second core.

One of the first and second cores may be the core comprising the master unit. Both the first and second cores may each comprise a master unit, however, only one of these master units might be active.

The first core may comprise a slave unit, a first processing unit and a second processing unit. The slave unit of the first core may be configured to: receive the first trigger; split the first trigger into at least a third trigger and a fourth trigger, wherein the third trigger comprises an indication of a third starting primitive in the element buffer and an instruction to render a third number of primitives starting from the third starting primitive, and the fourth trigger comprises an indication of a fourth starting primitive in the element buffer and an instruction to render a fourth number of primitives starting from the fourth starting primitive; send the third trigger to the first processing unit; and send the fourth trigger to the second processing unit. The first processing unit may be configured to process the third trigger; and the second processing unit may be configured to process the fourth trigger.

The slave unit of the first core may receive the first trigger directly from the core in which the master unit resides, or another hardware unit in the first core may receive the first trigger and forward it to the slave unit.

The slave unit of the first core may be configured to split the first trigger if the first number of primitives is greater than a threshold. The threshold may be the buffer size of one of the first and second processing units. The slave unit may be configured to determine whether the number of primitives in the first trigger is greater than the threshold.

The slave unit may be configured to: generate a first local interleave marker associated with the third trigger; generate a second local interleave marker associated with the fourth trigger; send the first local interleave marker to the first processing unit; and send the second local interleave marker to the second processing unit. The local interleave markers may define an ordering of the third and fourth triggers within the set of geometry processing tasks. The first local marker may be sent with the third trigger, and the second local marker may be sent with the fourth trigger.

The element buffer may be associated with an instance number defining a number of times that the primitives in the element buffer are to be rendered. The first core may be configured to, after processing the final primitive in the element buffer, continue processing the first trigger from the first primitive in the element buffer. The final primitive in the element buffer is the last complete primitive in the buffer The master unit may be configured to: determine a number of primitives-per-instance in the element buffer based on the topology information, wherein the number of primitives-per-instance is the number of complete primitives contained in one instance of the element buffer; and send the number of primitives-per-instance to at least the first core. The first core may be configured to detect, based on the first starting primitive and the number of primitives-per-instance, when the final primitive in the element buffer has been processed; and continue to process the first trigger starting from the first primitive in the element buffer.

The first core may comprise a processing unit that is configured to process the trigger, detect when the final primitive in the element buffer has been processed and continue to process the first trigger starting from the first primitive in the element buffer.

The set of geometry processing tasks may further comprise state information, and the splitting of the tasks may comprise splitting the tasks into the first trigger, the second trigger and the state information. The master unit may be configured to send the state information to the first core and to the second core.

The master unit may be configured to: generate a first global interleave marker associated with the first trigger; generate a second global interleave marker associated with the second trigger; send the first global interleave marker to the first core; and send the second global interleave marker to the second core. The global interleave markers may define an ordering of the first and second triggers within the set of geometry processing task.

The first and second cores (and more generally all of the cores in the GPU) may be connected by a register bus configured to carry register write commands. The master unit may be configured to output a first register write command that is addressed to the first core and that comprises an indication of the first trigger, and a second register write command that is addressed to the second core and that comprises an indication of the second trigger. The first and second register write commands may contain the first and second triggers respectively. The master unit may output the register write command directly to the register bus, or to another hardware unit in the core in which the master unit resides that interfaces with the register bus.

The GPU may comprise a third core comprising a slave unit. The master unit may be configured to split the set of geometry processing tasks into the first trigger, the second trigger and a fifth trigger. The master unit may assign and transmit the fifth trigger to the third core.

Also provided are: a graphics processing system comprising a GPU as summarised above; and a graphics processing system configured to perform a method as summarised above. The graphics processing system may be embodied in hardware on an integrated circuit.

Also provided is a method of manufacturing, using an integrated circuit manufacturing system, a graphics processing system or GPU as summarised above. The method may comprise processing, using a layout processing system, a computer readable description of the graphics processing system or GPU so as to generate a circuit layout description of an integrated circuit embodying the graphics processing system; and manufacturing, using an integrated circuit generation system, the graphics processing system or GPU according to the circuit layout description.

Also provided is computer readable code configured to cause a method as summarized above to be performed when the code is run; and a computer readable storage medium having encoded thereon said computer readable code. The computer readable storage medium may be a non-transitory computer readable storage medium.

Further provided is an integrated circuit definition dataset that, when processed in an integrated circuit manufacturing system, configures the integrated circuit manufacturing system to manufacture a graphics processing system or GPU as summarized above.

Also provided is a computer readable storage medium (optionally non-transitory) having stored thereon a computer readable description of a graphics processing system or GPU as summarised above that, when processed in an integrated circuit manufacturing system, causes the integrated circuit manufacturing system to manufacture an integrated circuit embodying the graphics processing system or GPU.

Also provided is a computer readable storage medium (optionally non-transitory) having stored thereon a computer readable description of a graphics processing system or GPU as summarised above that, when processed in an integrated circuit manufacturing system, causes the integrated circuit manufacturing system to: process, using a layout processing system, the computer readable description of the graphics processing system or GPU so as to generate a circuit layout description of an integrated circuit embodying the graphics processing system or GPU; and manufacture, using an integrated circuit generation system, the graphics processing system or GPU according to the circuit layout description.

Also provided is an integrated circuit manufacturing system configured to manufacture a graphics processing system or GPU as summarised above. The integrated circuit manufacturing system may comprise: a computer readable storage medium (optionally non-transitory) having stored thereon a computer readable description of a graphics processing system or GPU as summarised above; a layout processing system configured to process the computer readable description so as to generate a circuit layout description of an integrated circuit embodying the graphics processing system or GPU; and an integrated circuit generation system configured to manufacture the graphics processing system or GPU according to the circuit layout description.

The layout processing system may be configured to determine positional information for logical components of a circuit derived from the integrated circuit description so as to generate a circuit layout description of an integrated circuit embodying the graphics processing system or GPU.

There may be provided computer program code for performing any of the methods described herein. There may be provided non-transitory computer readable storage medium having stored thereon computer readable instructions that, when executed at a computer system, cause the computer system to perform any of the methods described herein.

The above features may be combined as appropriate, as would be apparent to a skilled person, and may be combined with any of the aspects of the examples described herein.

BRIEF DESCRIPTION OF THE DRAWINGS

Examples will now be described in detail with reference to the accompanying drawings in which.

Figure 1:
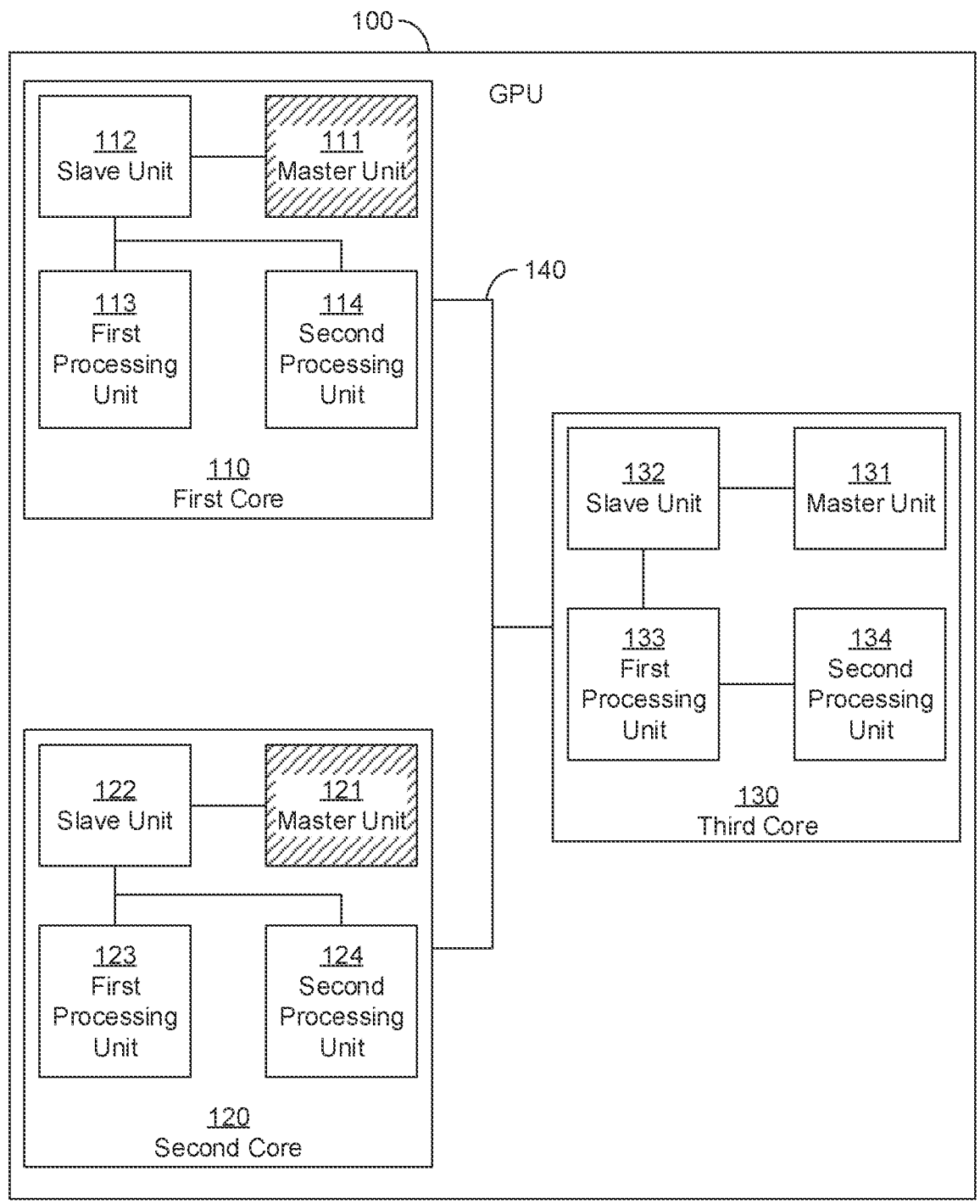
FIG. 1 is a block diagram of a GPU according to an example.

The accompanying drawings illustrate various examples. The skilled person will appreciate that the illustrated element boundaries (e.g., boxes, groups of boxes, or other shapes) in the drawings represent one example of the boundaries. It may be that in some examples, one element may be designed as multiple elements or that multiple elements may be designed as one element. Common reference numerals are used throughout the figures, where appropriate, to indicate similar features.

DETAILED DESCRIPTION

The following description is presented by way of example to enable a person skilled in the art to make and use the invention. The present invention is not limited to the embodiments described herein and various modifications to the disclosed embodiments will be apparent to those skilled in the art.

Embodiments will now be described by way of example only.

A set of geometry tasks may consist of a single draw call, or may comprise more than one draw call.

As will be explained, a set of geometry processing tasks references an element buffer that contains a set of elements. In some examples, the element buffer is an index buffer, and the elements are indices. Each index references a vertex in a vertex buffer. In other examples, the element buffer is the vertex buffer itself, and the elements are the vertices. It should be understood that the present disclosure can be generalised to apply to either kind of element buffer, even where a specific example references only an index buffer or only a vertex buffer.

In the following description, the terms "first", "second", "third", etc. are used to describe various elements of a GPU and a method. These terms are labels only, and do not imply a particular ordering or hierarchy of importance between the elements, unless explicitly stated otherwise.

An example according to the present disclosure provides a GPU. The GPU comprises a plurality of cores. At least one of the plurality of cores comprises a master unit configured to receive geometry processing tasks and distribute them between at least a first and a second core.

An exemplary GPU is depicted in FIG. 1. It should be understood that, while the example below describes a GPU comprising three cores, the present disclosure can be generalised to apply to a GPU comprising two or more cores.

The GPU 100 comprises a first core 110, a second core 120 and a third core 130. The first core 110 comprises a master unit 111, a slave unit 112, and two processing units 113, 114. The slave unit 112 is in communication with the master unit 111 and the two processing units 113, 114. The second core 120 comprises a master unit 121, a slave unit 122, and two processing units 123, 124. The slave unit 122 is in communication with the master unit 121 and the two processing units 123, 124. The third core 130 comprises a master unit 131, a slave unit 132 and two processing units 133 and 134. The slave unit 132 is in communication with the master unit 131 and the two processing units 133, 134. The processing units are configured to process the geometry processing tasks. In some examples, the slave unit(s) of each core may comprise one or more processing units.

The first, second and third cores 110, 120, 130 are connected by a register bus 140, and are in communication with one another such that the master unit 131 of the third core 130 can send information to the slave units 112, 122 of the first and second cores 110, 120 via the register bus 140. It is possible to utilise the register bus for master-slave communications due to the small size of those communications. For example, when the master unit 140 transmits a trigger to a core, rather than encoding the entire index buffer into the trigger, the master unit 140 may instead simply provide the slave unit enough information to find the necessary information. An example of this would be transmitting to the slave unit the address in memory of the index buffer.

In the present example, the master units 111, 121 are inactive, as represented by the hatching of these units in FIG. 1. In some examples, the first and second cores 110, 120 need not comprise master units. More generally, in some examples, all of the cores apart from the core comprising the active master unit might not include a master unit. In some examples, the core comprising the active master unit might not comprise a slave unit or processing units. However, using identical cores containing both master and slave units makes the GPU architecture more easily scalable—that is, it becomes simpler to design larger (or smaller) GPUs by adding (or removing) cores without disrupting the overall layout, and designs with different numbers of cores become easier to verify for correctness because there are fewer different units overall. Due to the relatively small on-chip size of the master units, inclusion of inactive master units does not use up a significant amount of chip space, and also provides redundancy should a master unit in another core develop a fault.

The master unit 131 is configured to receive a set of geometry processing tasks from an application driver. As mentioned above, the set of geometry processing tasks includes a reference to an element buffer containing a set of elements. In the present example, the set of geometry processing tasks comprises the address of an index buffer containing indices that correspond to vertices in a vertex buffer, and topology information that defines the semantics of the index buffer. The index buffer (and by extension, the vertex buffer) represents a set of primitives. Each primitive is defined by a set of indices, and by extension a set of vertices.

The topology information defines the semantics of the index buffer, meaning that it indicates to the master unit 131 how to interpret the index buffer. The indices in the index buffer could represent many different sets of primitives, depending on how the indices are grouped together. In general, it is not possible to tell from a list of indices, without additional information, how those indices should be grouped into primitives. The indices could be grouped together in many different ways, resulting in different (and incorrect) primitives. Only one interpretation of the index buffer will result in the correct set of primitives required to produce the desired rendered image.

Common index buffer topologies include triangle lists, triangle strips and triangle fans. In the triangle list topology, for each primitive there are three indices in the buffer (or, in other words, the buffer comprises three times the number of indices as it does primitives). In the triangle strip topology, each primitive other than the starting primitive is made of two indices shared with the previous primitive, plus one new index. In the triangle fan topology, each primitive is defined by a central index that is shared with all of the other primitives, and two additional indices, at least one of which is shared with a neighbouring primitive in the fan.

The master unit 131 is further configured to group, for each primitive, the indices in the index buffer that define that primitive. In other words, the master unit 131, using the topology information, associates together the indices in the index buffer that represent each primitive. This will be explained further with reference to FIG. 2.

Figure 2A:
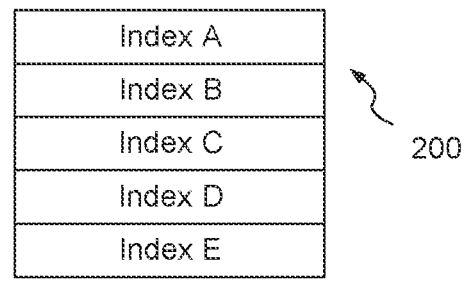
FIG. 2A is an illustration of an index buffer.
Figure 2B:
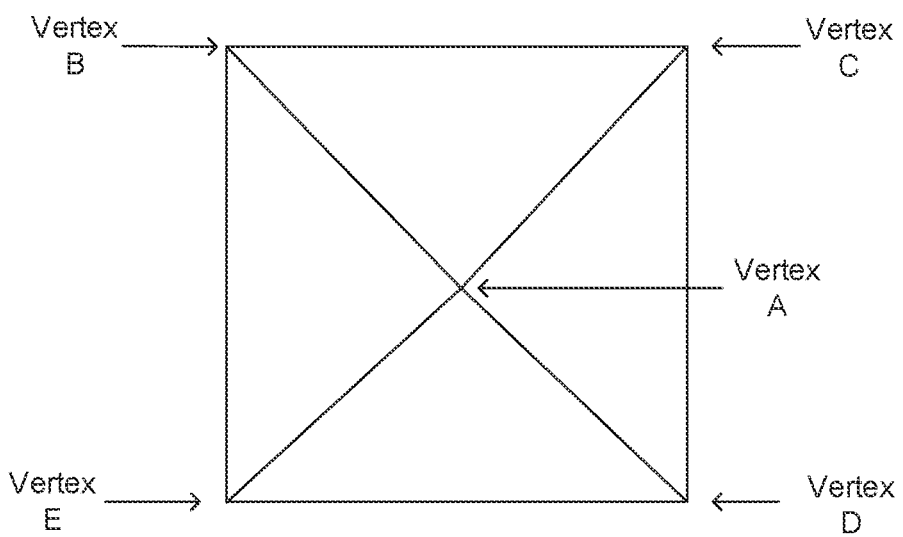
FIG. 2B is an illustration of a triangle fan.
Figure 2C:
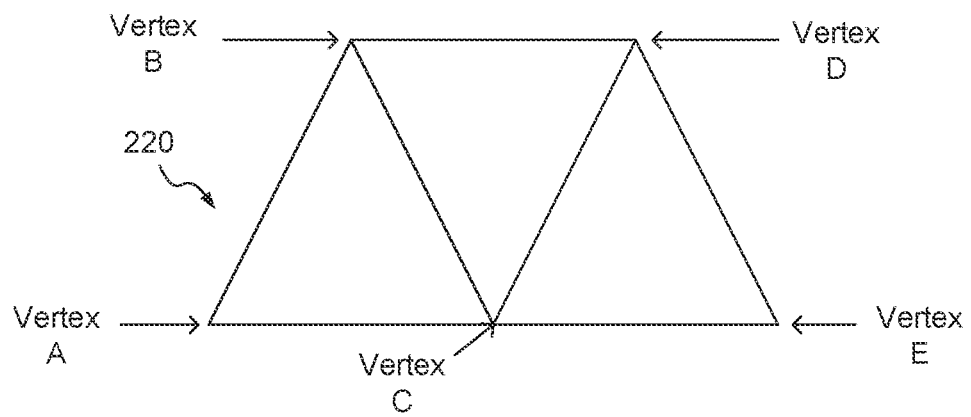
FIG. 2C is an illustration of a triangle strip.

FIG. 2A depicts an index buffer 200 containing five indices—ABCDE. In an example, the master unit 131 receives this index buffer 200 for processing. Without the topology information telling the master unit how the indices in the index buffer should be grouped, it is not clear how many primitives are contained within the buffer, and what the primitives to be processed are. For example, the master unit cannot determine whether the indices in the buffer represent triangles ABC, ACD, ADE and AEB (the triangle fan 210 shown in FIG. 2B), or triangles ABC and BCD and CDE (the triangle strip 220 shown in FIG. 2C). Consequently, the master unit cannot determine whether the primitives to be processed are the triangle fan 210, or the triangle strip 220. Only by using the topology information can the master unit distinguish between these different index buffer topologies and correctly group the indices into primitives.

In an image, some objects (and by extension, their corresponding primitives) appear more than once. The number of times an object appears in the scene is its instance number. In order to render such an object, the primitives that make up the object must be processed the number of times defined by the instance number of the object. This could be achieved by duplicating primitives in the index buffer, to ensure that a primitive is processed multiple times. However, this solution is memory inefficient because it duplicates existing information. A better solution is to associate an instance number with the index buffer. Based on this information, the master unit can determine that the primitives in the index buffer must be processed more than once, and can generate triggers instructing the processing of the correct number of primitives (which in total is the number of primitives in the buffer multiplied by the instance number). The cores can then process the triggers as they normally would, producing the duplicated primitives without requiring duplicated data in the index buffer or a separate copy of the index buffer.

The master unit 131 is further configured to determine the number of primitives-per-instance in the index buffer. The number of primitives-per-instance in the index buffer is the number of complete primitives contained in the index buffer, and can be determined once the indices have been grouped using the topology information. Only complete primitives are included in the number of primitives-per-instance. A complete primitive is a primitive that contains the correct number of indices for its shape. For example, a complete triangle primitive has three indices. Although an application will usually provide index buffers that contain only complete primitives, this is not always the case. Sometimes the index buffer contains additional indices that do not form complete primitives, denoted as "dangling" indices. An example of this is depicted in FIG. 3.

Figure 3:
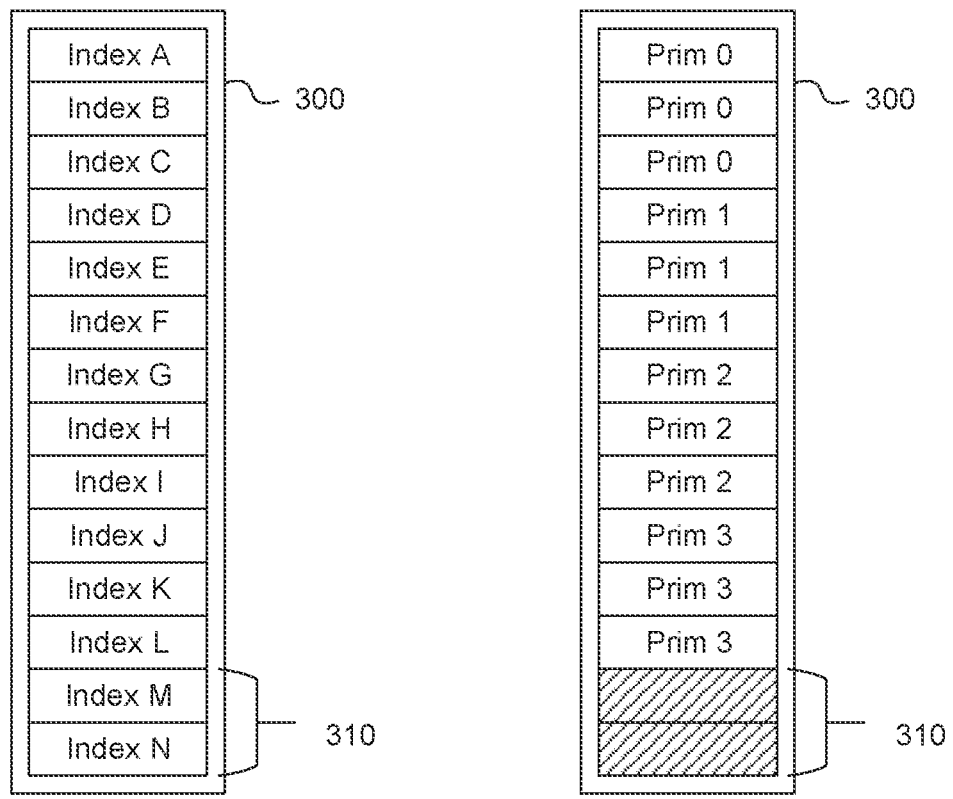
FIG. 3 is an illustration of an index buffer comprising dangling indices.

The index buffer 300 of FIG. 3 contains 14 indices (labelled A-N) and is of the triangle list type. Using this topology information, the indices can be grouped into four complete primitives (labelled 0-3). However, at the end of the index buffer are two additional indices 310. As the index buffer is in triangle list format, each primitive must have three corresponding indices. The two additional indices 310 cannot form a complete triangle primitive, and therefore they are dangling indices. In the example of FIG. 3, the master unit 131 would determine that the number of primitives-per-instance for index buffer 300 is four. The number of primitives-per-instance will be used to avoid the processing of the dangling indices, which will be explained in detail further below.

The master unit 131 is further configured to send the number of primitives-per-instance to the first core 110 and the second core 120.

The master unit 131 is further configured to split the set of geometry processing tasks into a first trigger and a second trigger. The first trigger comprises an indication of a first starting primitive, and an instruction to render a first number of primitives, beginning with that first starting primitive. The first starting primitive is the primitive in the index buffer from which the processing of the first trigger should be started. In this example, using the index buffer of FIG. 3 (which has a triangle list topology) and considering a single instance, the first starting primitive is primitive 0 (which, based on the topology information, can be identified as being formed from indices ABC), and the first trigger instructs the processing of two primitives (primitive 0 and primitive 1).

Similarly, the second trigger comprises an instruction to render a second number of primitives and an indication of a second starting primitive. The second starting primitive is primitive 2 (which, based on the topology information, can be identified as indices GHI), and the second trigger instructs the processing of two primitives (primitive 2 and primitive 3). In this way, the two triggers would, when processed, because all of the primitives that are represented in the index buffer 300 to be processed.

The master unit 131 is further configured to separate state information from the set of geometry processing tasks. State information refers to information that is required by the cores to process the geometry processing tasks. The state information is relevant to all of the triggers, containing information essential to process any of the triggers. One example of state information is the topology information. No matter which trigger is sent to a core, that core requires the topology information in order to find the starting primitive and to correctly process that primitive and the subsequent primitives.

While the splitting may produce many different triggers, it will only produce a single set of state information. Typically, a set of geometry processing tasks involves a workload that far exceeds the buffering capacity of the slave units of the GPU. For this reason, the master unit 131 normally splits the set of geometry processing tasks into many triggers, each within the buffering capacity of the slave units. In some examples, each trigger will also not exceed the buffering capacity of the processing units. In other examples, the triggers may still exceed the buffering capacity of the processing units. These triggers need to be further split by a slave unit to produce triggers that can be buffered and processed by a processing unit.

The master unit 131 usually does not immediately transmit to the cores all of the triggers that it splits from the set of geometry processing tasks. Rather, only a subset of the triggers are transmitted at any given time, with other triggers being held back for later transmission. In other words, for a set of geometry processing tasks, the master unit 131 will transmit multiple triggers to each core. However, the master unit 131 may transmit the state information to each core only once. Because the state information applies to all of the triggers, it need only be sent once to each core that receives one or more triggers. While the state information could be sent to each core multiple times, for example with each trigger, this would be inefficient and would unnecessarily increase the communication overhead between the cores.

Geometry processing tasks are not uniform in their complexity. Different triggers, even when they comprise the same number of tasks, may vary in overall complexity. Consequently, these triggers will take different lengths of time to process. This time difference can lead to skew between the cores, where one core finishes its tasks before another, reducing the degree of parallelisation in the GPU. To compensate for this variation in task complexity and reduce skew, the master unit may load balance the cores. Load balancing may be achieved by tracking how busy each core is (how much outstanding work each core currently has), and assigning additional tasks to the least busy core. This can help to prevent one core becoming idle while another core still has tasks to process. To achieve this, the master unit 131 typically sends small fractions of the total work to each core at any given time, and uses the remaining work to then load balance the cores. If too much work is sent to a core at any given time, this can compromise the load balancing between the cores by creating an insurmountable imbalance of workloads. Instead, it may be preferable to split a large set of tasks into triggers for smaller sets of tasks, as this allows for a finer degree of adjustment to the workloads of the cores. For this reason, the master unit may split the set of geometry processing tasks into triggers smaller than the buffering capacity of the slave units.

When splitting a set of geometry processing tasks, the master unit 131 may compare the number of primitives in the index buffer to a master splitting threshold. If the number of primitives is smaller than the master splitting threshold, it may be more efficient to simply forward the tasks to a core instead of spending the time and resources to split the set of tasks.

In some examples, the master unit 131 may split the set of geometry processing tasks such that each trigger comprises an instruction to render a number of primitives that is greater than or equal to the master splitting threshold. In other examples, the master unit 131 may split the set of geometry processing tasks such that each trigger comprises an instruction to render a number of primitives that is less than the master splitting threshold. The master unit 131 may split the set of tasks such that there is a trigger for each core, even where this requires each trigger to relate to a smaller number of primitives than the splitting threshold. When splitting tasks into triggers, the master unit 131 may split the tasks such that each trigger consists of tasks that were contiguous in the set of tasks.

In some examples (explained in more detail below), the slave unit 112 may further split the first trigger between a number of processing units, if the first trigger contains a number of primitives greater than a slave splitting threshold. In some examples, the master unit may be configured to split the set of tasks into triggers that are smaller than the splitting threshold of the slave units.

The master unit 131 is configured to assign the first trigger to the first core 110, and to assign the second trigger to the second core 120. The master unit 131 is configured to send the first trigger to the first core 110 and to send the second trigger to the second core 120. The sending of each trigger comprises outputting, by the master unit 131, a register write command that comprises an instruction to render a number of primitives and an indication of the starting primitive. Sending the first trigger involves outputting a first register write command addressed to the first core 110, comprising an instruction to render a first number of primitives and an indication of a first starting primitive. Similarly, sending the second trigger involves outputting, by the master unit 131, a second register write command addressed to the second core 120, comprising an instruction to render a second number of primitives and an indication of a second starting primitive. The register write commands are sent over the register bus 140.

The first core 110 is configured to receive the first trigger via the register bus 140. Because the first core 110 comprises multiple processing units, it is capable of processing geometry tasks in parallel. To achieve this, the slave unit 112 is able to split a trigger into two or more smaller triggers that can be distributed between the processing units 113, 114 and processed in parallel. The slave unit 112 is configured to determine whether the first number of primitives is larger than a slave splitting threshold. If the first number of primitives is smaller than this threshold, the slave unit 112 will not split the first trigger and will instead send the first trigger to one of the first or second processing units 113, 114 for processing.

However, if the first number of primitives is larger than the slave splitting threshold, the slave unit 112 is configured to split the first trigger into at least a third trigger and a fourth trigger. This splitting is analogous to the splitting performed by the master unit 131, and produces a third trigger comprising an instruction to render a third number of primitives and an indication of a third starting primitive; and a fourth trigger comprising an instruction to render a fourth number of primitives and an indication of a fourth starting primitive.

The slave unit 112 is configured to send the third trigger to the first processing unit 113, and to send the fourth trigger to the second processing unit 114. The processing unit 113 is configured to process the third trigger, and the processing unit 114 is configured to process the fourth trigger. More generally, a processing unit in a core is configured to receive triggers from the slave unit of that core, and to process the triggers.

The processing units 113, 114 are configured to, while processing a trigger, detect when the final primitive in the index buffer has been processed. The final primitive in the index buffer is the last complete primitive in the index buffer (meaning that dangling indices are ignored). For the example, considering the buffer 300 of FIG. 3, the final primitive is Prim 3. The processing units 113, 114 can detect when the final primitive in the index buffer has been processed based on the number of primitives-per-instance, the starting primitive for the trigger being processed, and the number of primitives in the trigger that have already been processed. This will be explained in more detail with reference to FIG. 4.

Figure 4:
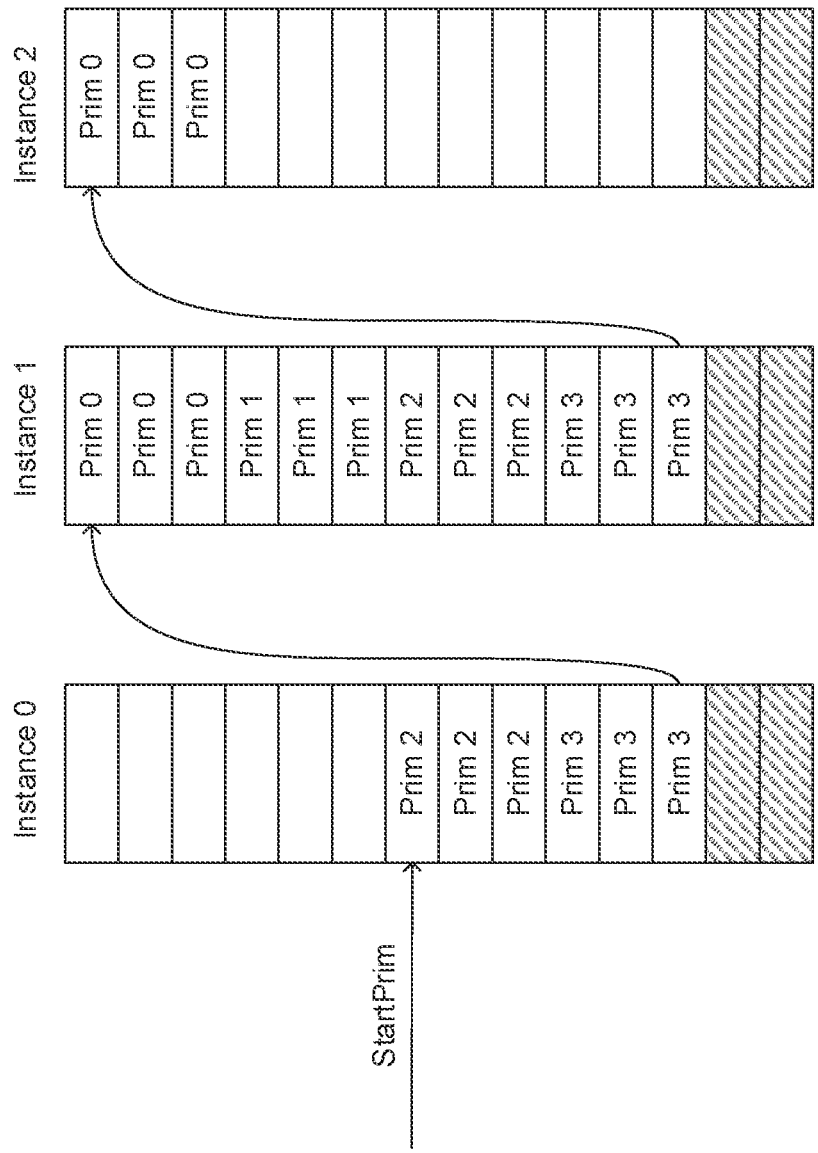
FIG. 4 is an illustration of an index buffer being processed according to an example.

FIG. 4 illustrates the processing of a trigger for the index buffer 300 of FIG. 3, the index buffer having an instance number of three. The trigger indicates that the starting primitive is the third primitive in the buffer (Prim 2), and instructs the processing unit to process seven primitives. Processing the trigger results in the first instance (instance 0) of the buffer being partially processed (only primitives 2 and 3 are processed), the second instance (instance 1) being completely processed, and the third instance (instance 2) being partially processed (only primitive 0 is processed). While not shown in FIG. 4, the master unit 131 will also have produced at least two additional triggers along with the trigger of FIG. 4. At least one of these additional triggers instructs the processing of Prim 0 and Prim 1, completing Instance 0. At least one other of these additional triggers instructs the processing of Prim 1, Prim 2, and Prim 3, completing Instance 2. Due to the potential for the trigger of FIG. 4 and the additional triggers to be processed in parallel, the triggers may be processed on different cores at different times. In other words, the triggers may be processed in any order, including being processed simultaneously. For this reason, the "completing" of Instance 0 by the additional trigger(s) may happen before, after, or simultaneously with the processing of the trigger of FIG. 4. In other words, the distinction between which trigger starts the processing of an instance and which trigger completes the processing of that instance depends on the order of the processing of the triggers, and not on the triggers themselves.

Prior to the processing of the trigger shown in FIG. 4 by the first processing unit 113, the master unit 131 will have determined that the number of primitives-per-instance for this index buffer is four, and will have sent the number of primitives-per-instance to the cores. Using this information, and given that the processing is to start at the third primitive (Prim 2) in the buffer, the first processing unit 113 can determine that the second primitive it processes is the final primitive in the index buffer 300. On processing this final primitive (Prim 3), the processing unit 113 can continue processing the trigger from the first primitive in the index buffer 300 (Prim 0). Knowing the number of primitives-per-instance in the index buffer, and continuing the processing from Prim 0, the processing unit 113 can determine that the sixth primitive it processes is the final primitive in the index buffer 300. After processing this primitive, the processing unit 113 can again continue processing from Prim 0, repeating the process described above until the processing unit 113 has processed the number of primitives instructed by the trigger. In this way, no dangling indices are processed and no attempt is made to process them.

The master unit 131 is configured to, after splitting the set of geometry processing tasks into first and second triggers and assigning the first and second triggers to the cores, generate global interleave markers associated with the first and second triggers. The global interleave markers define the order of the triggers within the set of geometry processing tasks. This order is important because image processing applications typically provide the GPU with tasks in the order that they are intended to be processed. When these tasks are processed by a single core, this order is naturally respected, and the output of the tasks maintain the order, which is carried through to later processing operations. However, when the tasks are split amongst multiple cores and processed in parallel, the ordering is no longer enforced inherently—tasks might or might not be processed and completed in their original order, by the different cores. In order to ensure that the outputs of the triggers (that is, the results of processing the relevant primitives) can be combined to recover the original order, the master unit 131 is configured to associate the first trigger with a first global interleave marker and associate the second trigger with a second global interleave marker. By recombining the outputs of the triggers according to their global interleave markers, the original ordering of the tasks can be recovered.

In some examples, the master unit 131 generates a new global interleave marker each time it splits a set of tasks into a trigger. In this way, each global interleave marker is associated with a single trigger, and vice versa. This can be done before the master unit 131 assigns the triggers to the cores, because the master unit 131 might not yet have determined which cores require additional tasks. In other examples, each global interleave marker may be associated with multiple consecutive triggers. For example, the master unit 131 may split a set of geometry processing tasks into three triggers—a first, second and third trigger, in which the first trigger corresponds to the first fraction of the set of tasks, the second trigger corresponds to the second fraction of the set of tasks, and the third trigger corresponds to the third fraction of the set of tasks. In this case, the terms "first", "second" and "third" relate to the order of the tasks—the first fraction of tasks precedes the second fraction of tasks, and the second fraction of tasks precedes the third fraction of tasks. If the master unit assigns the first and second triggers to the first core 110, and the third trigger to the second core 120, then the first and second triggers can be associated with the same global interleave marker. This is because the first and second triggers correspond to a contiguous set of tasks. The global interleave markers then only need to indicate that the third trigger comes after the first and second triggers in order to enable to proper combination of the outputs of the first core 110 and the second core 120.

More generally, each consecutive set of triggers (that is, each set of triggers that correspond to a contiguous set of tasks in the set of geometry processing tasks) that are all assigned to the same core may be associated with the same global interleave marker.

In a similar way, the slave unit 112 of the first core 110 is configured to generate local interleave markers when it splits triggers. This is necessary for the same reason that the generation of markers by the master unit 131 is necessary—when a core processes tasks using only one processing unit, the order in which the tasks are provided to the core is naturally maintained in the output of the processing unit. However, when tasks are processed in parallel using multiple processing units, this order can be violated. The local markers enable the correct order to be reconstructed.

An exemplary method performed by the GPU 100 will now be described with reference to FIG. 5.

In step 501 of the method 500 the master unit 131 receives a set of geometry processing tasks from an application driver. The content of the set of geometry processing tasks has been explained above. In step 502, the master unit 131 groups the indices into primitives based on the topology information. In step 503 the master unit 131 determines the number of primitives-per-instance in the index buffer. In step 504 the master unit 131 sends the number of primitives-per-instance to the first and second cores 110, 120.

In step 505 the master unit 131 splits the set of geometry processing tasks into a first trigger, a second trigger and state information. In this example, the first and second triggers relate to different instances (as explained above). In step 506 the master unit 131 sends the state information to the first and second cores 110, 120. In step 507 the master unit 131 assigns the first trigger to the first core 110. In step 508 the master unit 131 assigns the second trigger to the second core 120. In step 509 the master unit 131 sends the first trigger to the first core 110, the sending comprising outputting 509B a first register write command addressed to the first core 110, comprising an instruction to render a first number of primitives and an indication of a first starting primitive. In step 510 the master unit 131 sends the second trigger to the second core 120, the sending comprising outputting 510B a second register write command addressed to the second core 120, comprising an instruction to render a second number of primitives and an indication of a second starting primitive.

Figure 6:
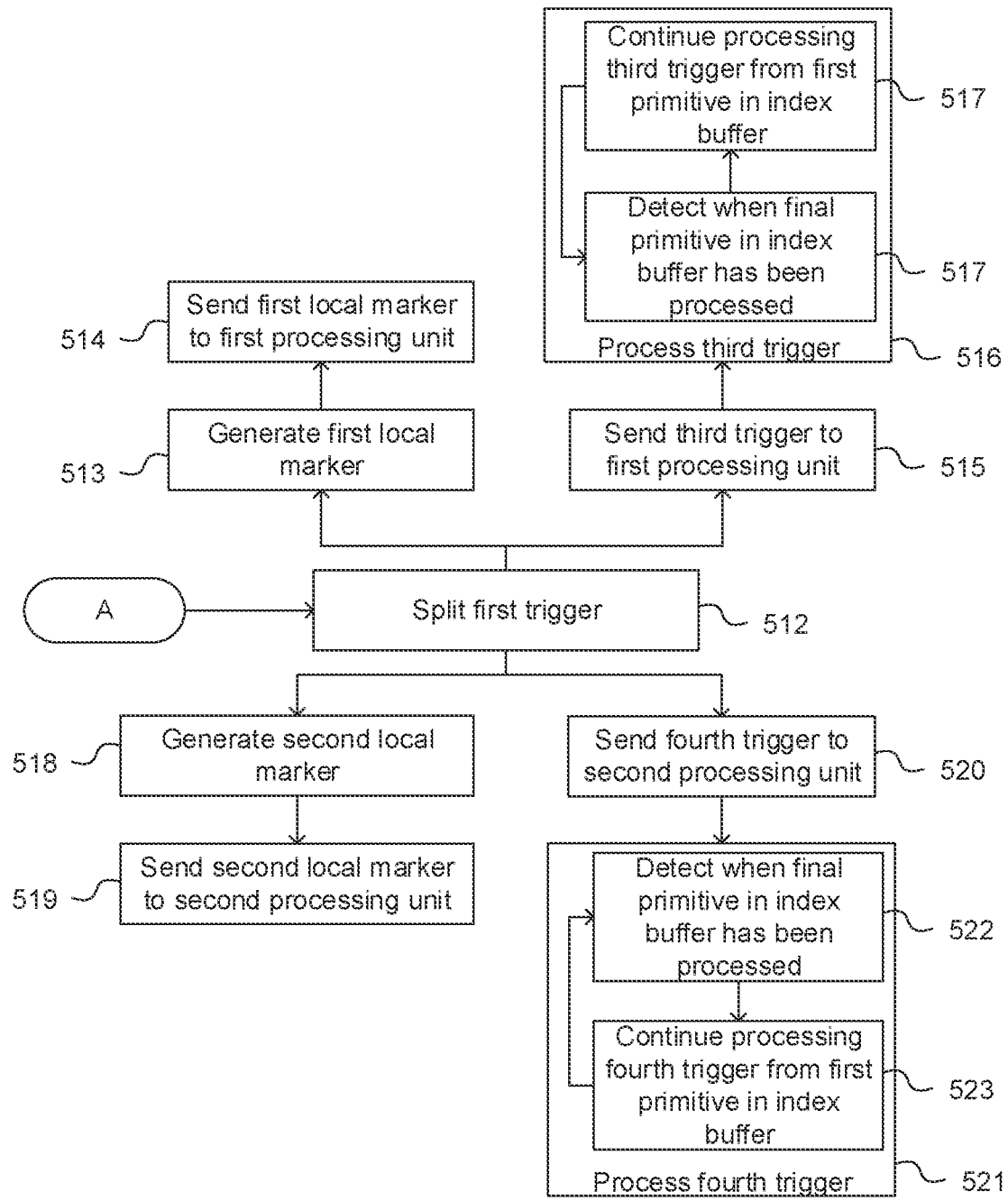
FIG. 6 is continuation of the flow chart of FIG. 5.

In step 511, the first core 110 receives the first trigger. Because, in this example, the first number of primitives of the first trigger is greater than the threshold (which in this example is the buffer size of the processing units 113, 114), the slave unit 112 of the first core 110 splits 512 the first trigger into a third trigger and a fourth trigger (see FIG. 6).

After splitting 512 the first trigger, in step 513 the slave unit 112 generates a first local interleave marker associated with the third trigger. In step 514 the slave unit 112 sends the first local interleave marker to the first processing unit 113. In step 515, the slave unit 110 sends the third trigger to the first processing unit 113. In step 516 the first processing unit 113 processes the third trigger. During the processing 516 of the third trigger, the first processing unit 113 detects 517 when the final primitive in the index buffer has been processed, and, if the third trigger has not yet been completed, the processing unit 113 continues 519 processing the third trigger from the first primitive in the index buffer. These detection 517 and continuation 518 steps loop until the trigger has been completely processed.

In step 518, the slave unit 112 generates a second local interleave marker associated with the fourth trigger. In step 519 the slave unit 112 sends the second local interleave marker to the second processing unit 114. In step 520 the slave unit 112 sends the fourth trigger to the second processing unit 114. In step 521 the second processing unit 114 processes the fourth trigger. During the processing 521 of the fourth trigger, the second processing unit 114 detects 522 when the final primitive in the index buffer has been processed, and, if the fourth trigger has not yet been completed, continues 523 processing the fourth trigger from the first primitive in the index buffer. The detecting, as described above, makes use of the number of primitives-per-instance.

Figure 5:
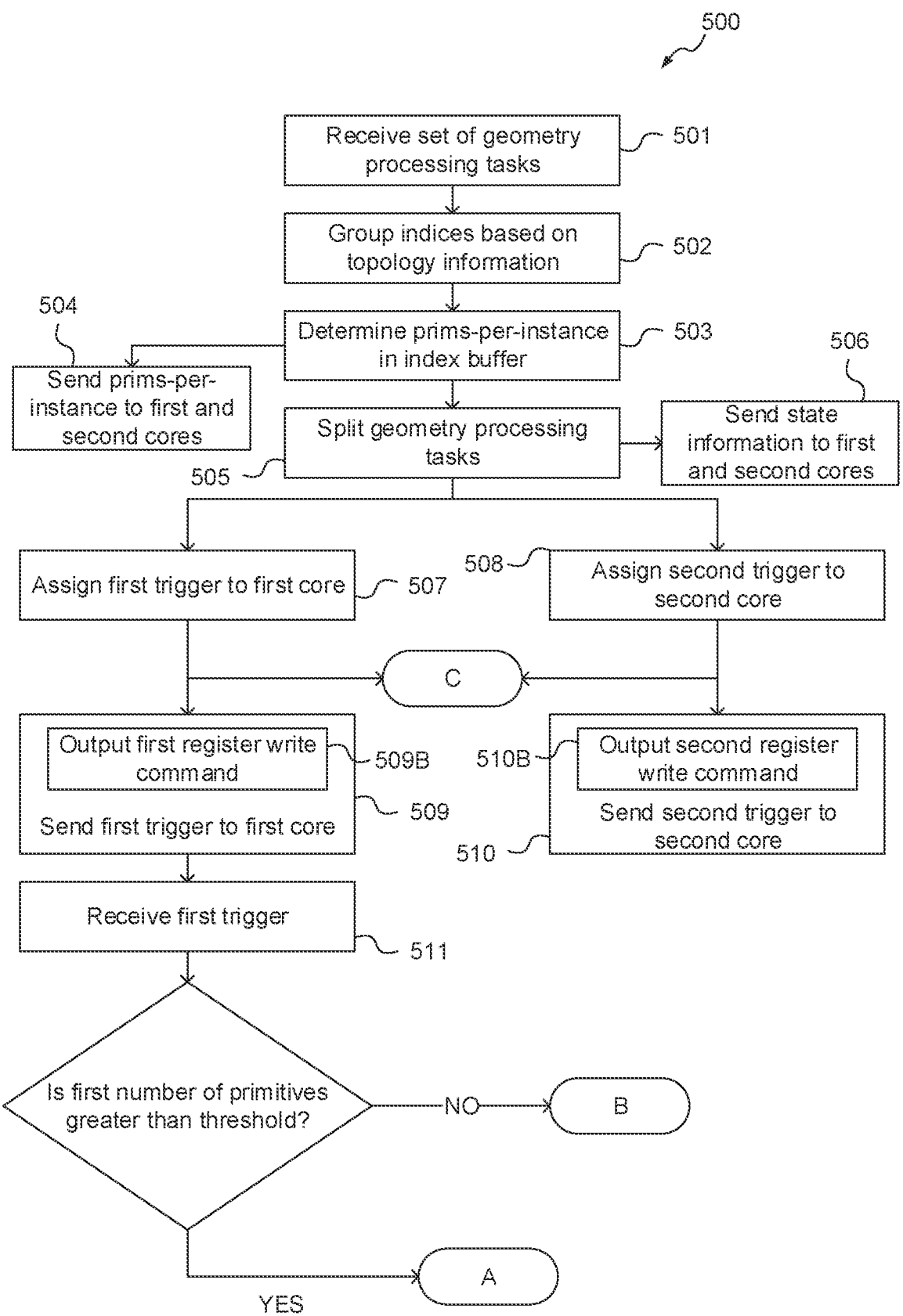
FIG. 5 is a flowchart illustrating a method according to an example.
Figure 7:
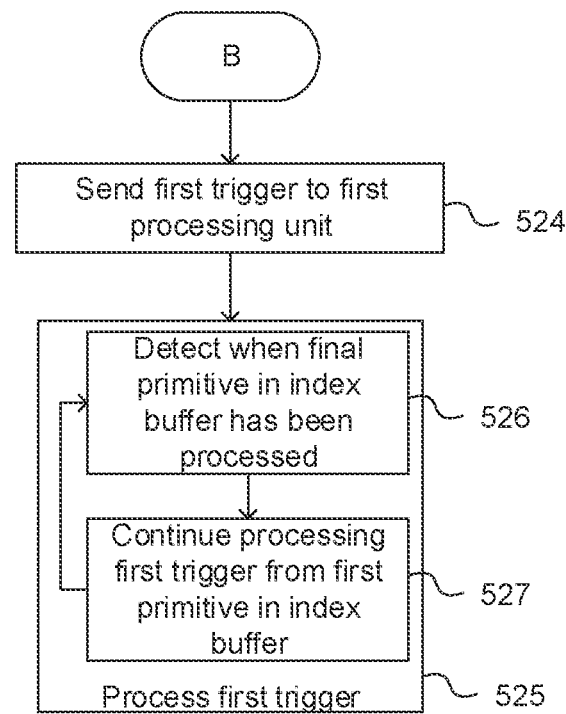
FIG. 7 is a continuation of the flowchart of FIG. 5.

FIG. 7 is a continuation of FIG. 5, and depicts the method performed by the GPU if the first number of primitives does not exceed the slave unit's splitting threshold.

In step 524, the slave unit 112 sends the first trigger to the first processing unit 113. In step 525, the first processing unit 113 processes the first trigger. The processing comprises detecting 526 and continuing 527 steps corresponding with the steps described above for the third and fourth triggers.

Figure 8:
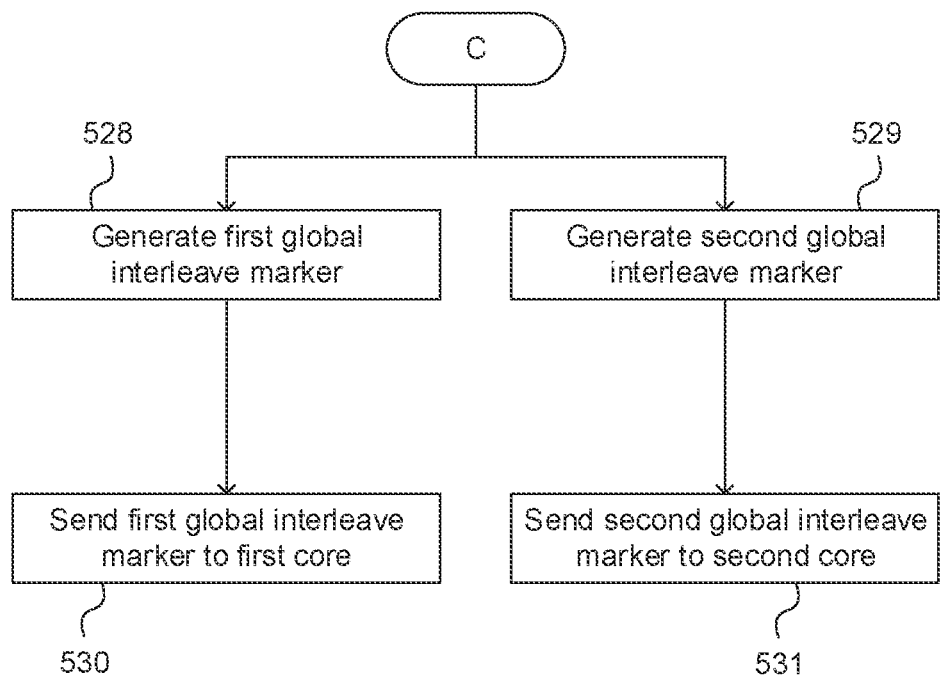
FIG. 8 is a continuation of the flowchart of FIG. 5.

FIG. 8 is a continuation of FIG. 5. In step 528, after the master unit has assigned 507 the first trigger to the first core 110 and assigned 508 the second trigger to the second core 120, the master unit 131 generates a first global interleave marker associated with the first trigger and a second global interleave marker associated with the second trigger. In step 529, the master unit 131 sends the first global interleave marker to the first core 110, and in step 530 the master unit 131 sends the second global interleave marker to the second core 120.

While not shown, the second core 120 may perform steps that correspond to those explained above for the first core. For example, the slave unit 122 of the second core 120 may split the second trigger and generate local interleave markers. More generally, any slave unit of the GPU 100 may perform the method steps described above for the slave unit 112.

The first, second and third cores 110, 120, 130 (and any other cores in the GPU) may all be identical (as in FIG. 1), meaning that they each contain a master unit, a slave unit and the same number of processing units. While not essential, this may be beneficial because it means that any of the cores can be configured to distribute geometry processing tasks. In some examples, the cores of the GPU may be segregated into two or more groups. Each group may comprise one core containing an active master unit that is responsible for distributing geometry processing tasks among the cores of its group, and that does not distribute geometry processing tasks to the cores of the other group(s).

It should be understood that the scope of the present disclosure is not limited to the examples above. Many variations are possible, including but not limited to the following.

In some examples, the master unit 131 may assign one of the first and second triggers to the third core, and may send that trigger to the slave unit 132 of the third core 130. In some examples, the master unit 131 may split the set of geometry processing tasks into more than two triggers. In some examples, the master unit 131 may split a third trigger from the set of geometry processing tasks, and may assign the third trigger to the third core.

While, in the examples described above, the master unit 131 was part of a third core 130 distinct from the first and second cores 110, 120, this need not be the case. In some examples, one of the first and second cores 110, 120 may comprise the master unit 131. In some examples, the GPU might only comprise two cores.

In another example, the GPU might contain only a single core. This single core contains only one master unit and only one slave unit. Furthermore, the single slave unit contains only one processing unit. This GPU cannot process tasks in parallel. However, it is nonetheless beneficial for the master unit to be configured to split the set of geometry processing tasks into a plurality of triggers, even though each trigger is ultimately assigned to and sent to a single slave unit. Splitting the tasks is beneficial because it enables the same master unit to be used in multi-core GPUs, single core GPUs containing multiple processing units (and therefore capable of parallel processing) and single core GPUs not capable of parallel processing (like the present example). By extension, it enables the core described above to operate in a multi-core system. If at any time a second core is introduced to the GPU, implementing parallel processing is simple because the first core is already configured to split tasks into triggers. All that is required to implement parallel processing is for the first core to assign and transmit some of the triggers to the second core.

In some examples, the master splitting threshold can be thought of as a target number of primitives to be sent to each core. For example, the master unit 131 might not compare the number of primitives in the index buffer to the master splitting threshold. Rather, the master unit 131 may maintain a running count that represents the splitting threshold minus the number of primitives assigned to a core. In some cases, the number of primitives in the index buffer may be larger than the splitting threshold. In these cases, while the running count indicates that fewer primitives have been assigned to a core than the splitting threshold amount, the master unit 131 may continue to populate a trigger assigned to that core with primitives. When the running count indicates that the threshold number of primitives have been assigned to that core, a new trigger that is assigned to a different core is created, and is populated with primitives. The running count is reset for that new trigger. In this way, the set of tasks is split. For example, the threshold may equal a number X. The running count may start with the value X, and a trigger assigned to a first core will be populated with primitives, reducing the value of the running count by one for each primitive that populates the trigger, until the running count reaches a value of 0. At this time, a new trigger assigned to a second core will be created and the process will repeat for that new trigger.

In some cases, the number of primitives in the index buffer of one draw call is less than the splitting threshold. In these cases, when populating a trigger with primitives from the index buffer, the splitting threshold will not be met. This means that all of the tasks in the draw call will be included in one trigger. However, the master unit will not reset the running count, because the splitting threshold has not yet been met. When the master unit receives a subsequent draw call, it creates a new trigger (assigned to the same core as before) and populates that trigger with tasks from the subsequent draw call. This series of triggers, created within one cycle of the running count and all assigned to the same core, maintains the original order of the geometry processing tasks. Consequently, the series of triggers can be associated with one global interleave marker. In this way, the splitting can span two or more draw calls. However, eventually, the splitting threshold will be met. When the splitting threshold is met, the master unit will create a further trigger assigned to a different core, the running count will be reset, and the further trigger will be populated with tasks. Thus, the set of tasks will be split.

In some examples, the slave unit 112 of the first core 120 determines whether the first number of tasks exceeds a slave splitting threshold. This threshold may be the buffer size of the processing units 113, 114 of the core 110. In some examples, the slave splitting threshold may be determined empirically. Similarly, the master splitting threshold may be determined empirically, and may be tuned to balance the competing considerations of creating sufficiently small triggers such that no core is left idle, while also creating triggers large enough that each core is kept busy without requiring frequent transmission of triggers over the register bus 140.

In an example described above, the slave unit 112 of the first core 110 performed splitting in which the first trigger was split into a third and fourth trigger. In some examples, the slave unit 112 may split the first trigger such that each resultant trigger is smaller than the slave splitting threshold. In other examples, the slave unit 112 may split the first trigger such that each resultant trigger is greater than (or equal to) the slave splitting threshold. In some examples, the slave unit 112 may split the first trigger such that there is at least one trigger for each processing unit 113, 114.

As with the global interleave markers, a local interleave marker may be associated with more than one trigger. The interleave markers may be hierarchical, in that multiple local interleave markers may be associated with a global interleave marker. The local interleave markers indicate the order in which the outputs of different processing units within a core should be combined to recover the original order of the trigger sent to the core, and the global interleave marker indicates the order in which the outputs of all of the triggers sent to all of the cores should be combined to fully recover the order of the set of geometry processing tasks.

The processing units of the cores are agnostic as to whether a trigger they are processing was split only by the master unit, or also split by a slave unit. The processing units handle such triggers identically. Similarly, the slave units can be agnostic as to whether a trigger is freshly received from the master unit 131, or has already been split once by the slave unit. In either case, the slave unit can determine whether the trigger exceeds the splitting threshold, and can handle the trigger as described above.

It should be understood that method steps 503-504, 506, 509B, 510B and steps 511-531 are optional. In some examples, some or all of these method steps may be omitted.

In some examples, the slave units do not split the triggers that they receive from the master unit 131. For example, where a core contains only a single processing unit, the slave unit of that core might not split the triggers it receives from the master unit 131. Consequently, the slave units might not compare the triggers to a splitting threshold. Where a core receives multiple triggers and does not process those triggers in parallel, it need not generate local interleave markers, however, it may nonetheless generate local interleave markers for reasons of scalability.

In some examples, the master unit 131 might not calculate the number of primitives-per-instance for the index buffer. Rather, this information may be provided to the master unit 131 by the application.

In some examples, the master unit 131 might not output register write commands, and instead may send the triggers by any suitable alternative means. In some examples, the triggers might not be communicated over the register bus 140. Rather, the cores may be linked by dedicated connections configured to carry the triggers.

In some examples, each core may comprise an interface unit. The interface unit may be in communication with the master unit and the slave unit of the core, as well as the register bus 140. The interface unit of the core comprising the master unit 131 may receive register write commands from the master unit 131 and forward the register write commands to the cores to which they are addressed, over the register bus 140. The interface units of the first and second cores 110, 120, may receive the register write commands and forward them to the slave units 112, 122. Where the master unit 131 assigns a trigger to the core in which it resides, it may send the trigger directly to the slave unit of the core, instead of via the interface unit of the core.

In some examples, the cores of the GPU are not identical. In some examples, the inactive master units 111, 121 of the first and second cores 110, 120 of GPU 100 might not be present. More generally, any inactive unit may be excluded. In some examples, the cores may have different numbers of processing units. It may be beneficial for a core with a greater number of processing units to split a set of tasks into a greater number of triggers than a core with a smaller number of processing units, because this enables the core with the greater number of processing units to employ a greater degree of parallelisation.

While the third core 130 of the GPU 100 of FIG. 1 comprises a slave unit 132 and processing units 133, 134, this is not necessarily the case for all examples. In some examples, the third core 130 is not configured to process triggers, and does not include a slave unit or processing units.

In some examples (as in FIG. 1), each slave unit may comprise one or more processing units. The one or more processing units may comprise dedicated hardware configured to perform geometry processing tasks. In other examples, the one or more processing units might not comprise dedicated hardware.

In the examples described above, the set of geometry processing tasks included a reference to an index buffer. In some cases, it may be preferable to process the geometry processing tasks using the vertex buffer (without using indices). In these cases, methods corresponding to those described above can be performed, but acting on the vertex buffer directly instead of on an index buffer.

In an example of the GPU 100, the set of geometry processing tasks received by the master unit 131 includes an indication of a set of vertices in a vertex buffer, and topology information. The topology information defines the semantics of the vertex buffer, which, corresponding to the method explained above for an index buffer, indicates how the master unit 131 should interpret the vertices in the vertex buffer. The master unit 131 is configured to group, for each primitive, the vertices in the vertex buffer that define that primitive.

As has been explained, some primitives appear more than once in a scene. To avoid duplicating primitives in the vertex buffer, or requiring a duplication of the vertex buffer entirely, an instance number can be associated with the vertex buffer. The master unit 131 is configured to determine the number of primitives-per-instance in the vertex buffer, considering only complete primitives (primitives formed from the correct number of vertices for their shape).

The master unit 131 is further configured to determine the number of primitives-per-instance in the vertex buffer, and to send the number of primitives-per-instance to the first core 110 and the second core 120.

The master unit 131 is configured to split the set of geometry processing tasks into a first trigger and a second trigger. The first trigger comprises an indication of a first starting primitive, and an instruction to render a first number of primitives, beginning with that first starting primitive. The first starting primitive is the primitive in the vertex buffer from which the processing of the first trigger should be started. As in the other examples, the second trigger comprises an indication of a second starting primitive, and an instruction to render a second number of primitives, beginning with that second starting primitive. The second starting primitive is the primitive in the vertex buffer from which the processing of the second trigger should be started.

Figure 9:
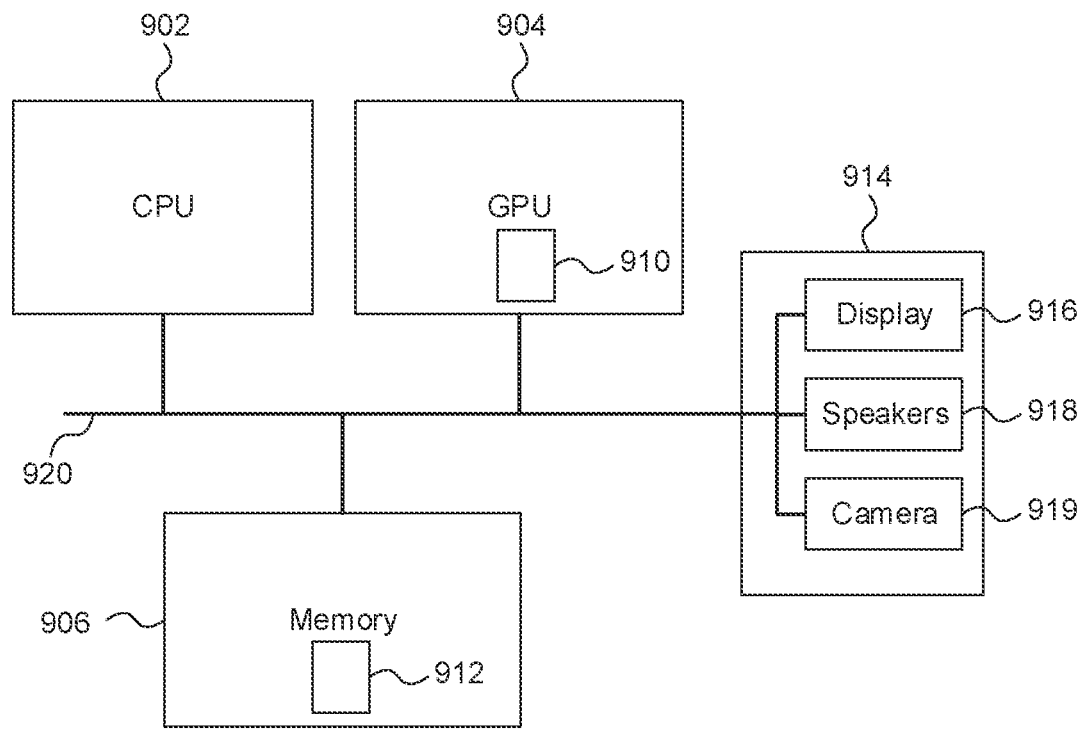
FIG. 9 shows a computer system in which a graphics processing system is implemented.

FIG. 9 shows a computer system in which the graphics processing systems described herein may be implemented. The computer system comprises a CPU 902, a GPU 904, a memory 906 and other devices 914, such as a display 916, speakers 918 and a camera 919. A processing block 910 (corresponding to cores 110, 120, 30 and register bus 140) is implemented on the GPU 904. In other examples, the processing block 910 may be implemented on the CPU 902. The components of the computer system can communicate with each other via a communications bus 920.

The GPU of FIG. 1 is shown as comprising a number of functional blocks. This is schematic only and is not intended to define a strict division between different logic elements of such entities. Each functional block may be provided in any suitable manner. It is to be understood that intermediate values described herein as being formed by a GPU need not be physically generated by the GPU at any point and may merely represent logical values which conveniently describe the processing performed by the GPU between its input and output.

The GPUs described herein may be embodied in hardware on an integrated circuit. The GPUs described herein may be configured to perform any of the methods described herein. Generally, any of the functions, methods, techniques or components described above can be implemented in software, firmware, hardware (e.g., fixed logic circuitry), or any combination thereof. The terms "module," "functionality," "component", "element", "unit", "block" and "logic" may be used herein to generally represent software, firmware, hardware, or any combination thereof. In the case of a software implementation, the module, functionality, component, element, unit, block or logic represents program code that performs the specified tasks when executed on a processor. The algorithms and methods described herein could be performed by one or more processors executing code that causes the processor(s) to perform the algorithms/methods. Examples of a computer-readable storage medium include a random-access memory (RAM), read-only memory (ROM), an optical disc, flash memory, hard disk memory, and other memory devices that may use magnetic, optical, and other techniques to store instructions or other data and that can be accessed by a machine.

The terms computer program code and computer readable instructions as used herein refer to any kind of executable code for processors, including code expressed in a machine language, an interpreted language or a scripting language. Executable code includes binary code, machine code, bytecode, code defining an integrated circuit (such as a hardware description language or netlist), and code expressed in a programming language code such as C, Java® or OpenCL. Executable code may be, for example, any kind of software, firmware, script, module or library which, when suitably executed, processed, interpreted, compiled, executed at a virtual machine or other software environment, cause a processor of the computer system at which the executable code is supported to perform the tasks specified by the code.

A processor, computer, or computer system may be any kind of device, machine or dedicated circuit, or collection or portion thereof, with processing capability such that it can execute instructions. A processor may be any kind of general purpose or dedicated processor, such as a CPU, GPU, NNA, System-on-chip, state machine, media processor, an application-specific integrated circuit (ASIC), a programmable logic array, a field-programmable gate array (FPGA), or the like. A computer or computer system may comprise one or more processors.

It is also intended to encompass software which defines a configuration of hardware as described herein, such as HDL (hardware description language) software, as is used for designing integrated circuits, or for configuring programmable chips, to carry out desired functions. That is, there may be provided a computer readable storage medium having encoded thereon computer readable program code in the form of an integrated circuit definition dataset that when processed (i.e. run) in an integrated circuit manufacturing system configures the system to manufacture a GPU or graphics processing system configured to perform any of the methods described herein, or to manufacture a GPU or graphics processing system comprising any apparatus described herein. An integrated circuit definition dataset may be, for example, an integrated circuit description.

Therefore, there may be provided a method of manufacturing, at an integrated circuit manufacturing system, a GPU or graphics processing system as described herein. Furthermore, there may be provided an integrated circuit definition dataset that, when processed in an integrated circuit manufacturing system, causes the method of manufacturing a GPU or graphics processing system to be performed.

An integrated circuit definition dataset may be in the form of computer code, for example as a netlist, code for configuring a programmable chip, as a hardware description language defining hardware suitable for manufacture in an integrated circuit at any level, including as register transfer level (RTL) code, as high-level circuit representations such as Verilog or VHDL, and as low-level circuit representations such as OASIS (RTM) and GDSII. Higher level representations which logically define hardware suitable for manufacture in an integrated circuit (such as RTL) may be processed at a computer system configured for generating a manufacturing definition of an integrated circuit in the context of a software environment comprising definitions of circuit elements and rules for combining those elements in order to generate the manufacturing definition of an integrated circuit so defined by the representation. As is typically the case with software executing at a computer system so as to define a machine, one or more intermediate user steps (e.g. providing commands, variables etc.) may be required in order for a computer system configured for generating a manufacturing definition of an integrated circuit to execute code defining an integrated circuit so as to generate the manufacturing definition of that integrated circuit.

An example of processing an integrated circuit definition dataset at an integrated circuit manufacturing system so as to configure the system to manufacture a GPU or graphics processing system will now be described with respect to FIG. 10.

Figure 10:
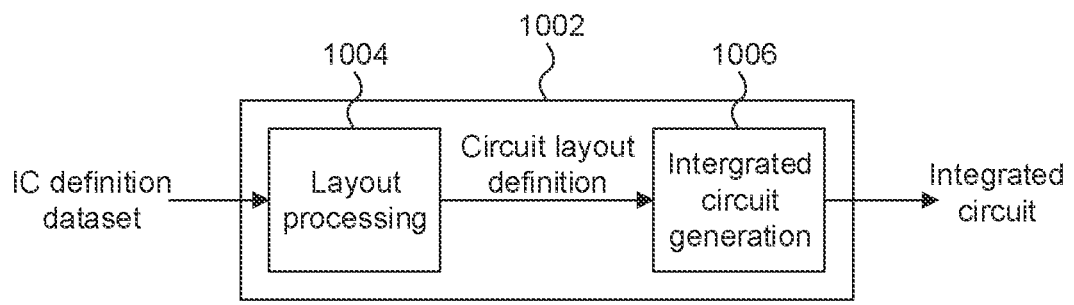
FIG. 10 shows an integrated circuit manufacturing system for generating an integrated circuit embodying a GPU or graphics processing system.

FIG. 10 shows an example of an integrated circuit (IC) manufacturing system 1002 which is configured to manufacture a GPU or graphics processing system as described in any of the examples herein. In particular, the IC manufacturing system 1002 comprises a layout processing system 1004 and an integrated circuit generation system 1006. The IC manufacturing system 1002 is configured to receive an IC definition dataset (e.g. defining a GPU or graphics processing system as described in any of the examples herein), process the IC definition dataset, and generate an IC according to the IC definition dataset (e.g. which embodies a GPU or graphics processing system as described in any of the examples herein). The processing of the IC definition dataset configures the IC manufacturing system 1002 to manufacture an integrated circuit embodying a GPU or graphics processing system as described in any of the examples herein.

The layout processing system 1004 is configured to receive and process the IC definition dataset to determine a circuit layout. Methods of determining a circuit layout from an IC definition dataset are known in the art, and for example may involve synthesising RTL code to determine a gate level representation of a circuit to be generated, e.g. in terms of logical components (e.g. NAND, NOR, AND, OR, MUX and FLIP-FLOP components). A circuit layout can be determined from the gate level representation of the circuit by determining positional information for the logical components. This may be done automatically or with user involvement in order to optimise the circuit layout. When the layout processing system 1004 has determined the circuit layout it may output a circuit layout definition to the IC generation system 1006. A circuit layout definition may be, for example, a circuit layout description.

The IC generation system 1006 generates an IC according to the circuit layout definition, as is known in the art. For example, the IC generation system 1006 may implement a semiconductor device fabrication process to generate the IC, which may involve a multiple-step sequence of photo lithographic and chemical processing steps during which electronic circuits are gradually created on a wafer made of semiconducting material. The circuit layout definition may be in the form of a mask which can be used in a lithographic process for generating an IC according to the circuit definition. Alternatively, the circuit layout definition provided to the IC generation system 1006 may be in the form of computer-readable code which the IC generation system 1006 can use to form a suitable mask for use in generating an IC.

The different processes performed by the IC manufacturing system 1002 may be implemented all in one location, e.g. by one party. Alternatively, the IC manufacturing system 1002 may be a distributed system such that some of the processes may be performed at different locations, and may be performed by different parties. For example, some of the stages of: (i) synthesising RTL code representing the IC definition dataset to form a gate level representation of a circuit to be generated, (ii) generating a circuit layout based on the gate level representation, (iii) forming a mask in accordance with the circuit layout, and (iv) fabricating an integrated circuit using the mask, may be performed in different locations and/or by different parties.

In other examples, processing of the integrated circuit definition dataset at an integrated circuit manufacturing system may configure the system to manufacture a GPU or graphics processing system without the IC definition dataset being processed so as to determine a circuit layout. For instance, an integrated circuit definition dataset may define the configuration of a reconfigurable processor, such as an FPGA, and the processing of that dataset may configure an IC manufacturing system to generate a reconfigurable processor having that defined configuration (e.g. by loading configuration data to the FPGA).

In some embodiments, an integrated circuit manufacturing definition dataset, when processed in an integrated circuit manufacturing system, may cause an integrated circuit manufacturing system to generate a device as described herein. For example, the configuration of an integrated circuit manufacturing system in the manner described above with respect to FIG. 10 by an integrated circuit manufacturing definition dataset may cause a device as described herein to be manufactured.

In some examples, an integrated circuit definition dataset could include software which runs on hardware defined at the dataset or in combination with hardware defined at the dataset. In the example shown in FIG. 10, the IC generation system may further be configured by an integrated circuit definition dataset to, on manufacturing an integrated circuit, load firmware onto that integrated circuit in accordance with program code defined at the integrated circuit definition dataset or otherwise provide program code with the integrated circuit for use with the integrated circuit.

The implementation of concepts set forth in this application in devices, apparatus, modules, and/or systems (as well as in methods implemented herein) may give rise to performance improvements when compared with known implementations. The performance improvements may include one or more of increased computational performance, reduced latency, increased throughput, and/or reduced power consumption. During manufacture of such devices, apparatus, modules, and systems (e.g. in integrated circuits) performance improvements can be traded-off against the physical implementation, thereby improving the method of manufacture. For example, a performance improvement may be traded against layout area, thereby matching the performance of a known implementation but using less silicon. This may be done, for example, by reusing functional blocks in a serialised fashion or sharing functional blocks between elements of the devices, apparatus, modules and/or systems. Conversely, concepts set forth in this application that give rise to improvements in the physical implementation of the devices, apparatus, modules, and systems (such as reduced silicon area) may be traded for improved performance. This may be done, for example, by manufacturing multiple instances of a module within a predefined area budget.

The applicant hereby discloses in isolation each individual feature described herein and any combination of two or more such features, to the extent that such features or combinations are capable of being carried out based on the present specification as a whole in the light of the common general knowledge of a person skilled in the art, irrespective of whether such features or combinations of features solve any problems disclosed herein. In view of the foregoing description it will be evident to a person skilled in the art that various modifications may be made within the scope of the invention.

What is claimed is:

1. A method of distributing a set of geometry processing tasks in a graphics processing unit comprising a plurality of cores, the method comprising:
    receiving, by one of the plurality of cores, the set of geometry processing tasks, wherein the set of geometry processing tasks comprises:
        an indication of a set of elements in an element buffer, and
        topology information, wherein the topology information defines the semantics of the element buffer;

grouping, by said one of the plurality of cores and based on the topology information, the elements into primitives;

splitting, by said one of the plurality of cores, the set of geometry processing tasks into at least a first trigger and a second trigger, wherein the first trigger comprises an indication of a first starting primitive in the element buffer and an instruction to render a first number of primitives, and the second trigger comprises an indication of a second starting primitive in the element buffer and an instruction to render a second number of primitives;

assigning, by said one of the plurality of cores, the first trigger to a first core of the plurality of cores;

assigning, by said one of the plurality of cores, the second trigger to a second core of the plurality of cores;

sending, by said one of the plurality of cores, the first trigger to the first core; and sending, by said one of the plurality of cores, the second trigger to the second core.

2. The method of claim 1, wherein the first core comprises a slave unit, a first processing unit and a second processing unit, and wherein the method further comprises:

receiving, by the slave unit of the first core, the first trigger;

splitting, by the slave unit of the first core, the first trigger into at least a third trigger and a fourth trigger; wherein the third trigger comprises an indication of a third starting primitive in the element buffer and an instruction to render a third number of primitives, and the fourth trigger comprises an indication of a fourth starting primitive in the element buffer and an instruction to render a fourth number of primitives;

sending, by the slave unit of the first core, the third trigger to the first processing unit;

sending, by the slave unit of the first core, the fourth trigger to the second processing unit;

processing, by the first processing unit, the third trigger; and processing, by the second processing unit, the fourth trigger.

3. The method of claim 2, wherein the splitting by the slave unit of the first core comprises:

generating by the slave unit a first local interleave marker associated with the third trigger;

generating by the slave unit a second local interleave marker associated with the fourth trigger;

sending by the slave unit, to the first processing unit, the first local interleave marker; and sending by the slave unit, to the second processing unit, the second local interleave marker;

wherein the local interleave markers define an ordering of the third and fourth triggers within the set of geometry processing tasks.

4. The method of claim 1, wherein:

the element buffer is associated with an instance number defining a number of times that the primitives in the element buffer are to be rendered; and when the first core has finished processing the final primitive in the element buffer, if the instance just processed is less than the instance number, the core continues processing the first trigger from the first primitive in the element buffer.

5. The method of claim 4, further comprising:

determining, by said one of the plurality of cores, a number of primitives-per-instance in the element buffer based on the topology information, wherein the number of primitives-per-instance is the number of complete primitives in the element buffer;

sending by said one of the plurality of cores, to at least the first core, the number of primitives-per-instance in the element buffer;

detecting, by the first core, based on the first starting primitive and the number of primitives-per-instance, when the first core has processed the final primitive in the element buffer; and continuing, by the first core, to process the first trigger starting from the first primitive in the element buffer.

6. The method of claim 1, wherein:

the element buffer is associated with an instance number defining a number of times the primitives in the element buffer are to be rendered;

the instance number is at least two;

the first trigger comprises first primitives of a first instance of the element buffer; and the second trigger comprises second primitives of the first instance of the element buffer, and further comprises primitives of a second instance of the element buffer.

7. The method of claim 1, wherein:

the set of geometry processing tasks further comprises state information;

the splitting of the set of geometry processing tasks by said one of the plurality of cores comprises splitting the set of geometry processing tasks into the first trigger, the second trigger and the state information; and wherein the method further comprises:

sending, by said one of the plurality of cores, the state information to the first core; and sending, by said one of the plurality of cores, the state information to the second core.

8. The method of claim 1, wherein the splitting of the set of geometry processing tasks comprises:

generating by said one of the plurality of cores a first global interleave marker associated with the first trigger;

generating by said one of the plurality of cores a second global interleave marker associated with the second trigger;

sending by said one of the plurality of cores, to the first core, the first global interleave marker; and sending by said one of the plurality of cores, to the second core, the second global interleave marker;

wherein the global interleave markers define an ordering of the first and second triggers within the set of geometry processing task.

9. The method of claim 1, wherein:

the first core and the second core are connected by a register bus configured to carry register write commands;

sending the first trigger comprises outputting, by said one of the plurality of cores, a first register write command that is addressed to the first core and that comprises an indication of the first trigger; and sending the second trigger comprises outputting, by said one of the plurality of cores, a second register write command that is addressed to the second core and that comprises an indication of the second trigger.

10. The method of claim 1, wherein the element buffer is an index buffer, each element of the element buffer is an index in the index buffer, and each index in the index buffer indicates the location of a vertex in a vertex buffer.

11. A graphics processing unit comprising a plurality of cores, wherein one of the plurality of cores is configured to:
  receive a set of geometry processing tasks comprising:
    an indication of a set of elements in an element buffer, and
    topology information, wherein the topology information defines the semantics of the element buffer;
  group the elements in the element buffer into primitives based on the topology information;
  split the set of geometry processing tasks into at least a first trigger and a second trigger, wherein the first trigger comprises an indication of a first starting primitive in the element buffer and an instruction to render a first number of primitives, and the second trigger comprises an indication of a second starting primitive in the element buffer and an instruction to render a second number of primitives;
  assign the first trigger to a first core of the plurality of cores;
  assign the second trigger to a second core of the plurality of cores;
  send the first trigger to the first core; and
  send the second trigger to the second core.

12. The graphics processing unit of claim 11, wherein:
  the first core comprises a slave unit, a first processing unit and a second processing unit;
  the slave unit of the first core is configured to:
    receive the first trigger,
      split the first trigger into at least a third trigger and a fourth trigger, wherein the third trigger comprises an indication of a third starting primitive in the element buffer and an instruction to render a third number of primitives, and the fourth trigger comprises an indication of a fourth starting primitive in the element buffer and an instruction to render a fourth number of primitives,
      send the third trigger to the first processing unit, and
      send the fourth trigger to the second processing unit;
  the first processing unit is configured to process the third trigger; and
  the second processing unit is configured to process the fourth trigger.

13. The graphics processing unit of claim 12, wherein the slave unit is configured to:
  generate a first local interleave marker associated with the third trigger;
  generate a second local interleave marker associated with the fourth trigger;
  send the first local interleave marker to the first processing unit; and
  send the second local interleave marker to the second processing unit;
  wherein the local interleave markers define an ordering of the third and fourth triggers within the set of geometry processing tasks.

14. The graphics processing unit of claim 11, wherein:
  the element buffer is associated with an instance number defining a number of times that the primitives in the element buffer are to be rendered; and
  the first core is configured to, after processing the final primitive in the element buffer, continue processing the first trigger from the first primitive in the element buffer.

15. The graphics processing unit of claim 14, wherein said one of the plurality of cores is configured to:
  determine a number of primitives-per-instance in the element buffer based on the topology information, wherein the number of primitives-per-instance is the number of complete primitives contained in one instance of the element buffer, and
  send the number of primitives-per-instance to at least the first core; and
  wherein the first core is configured to:
  detect, based on the first starting primitive and the number of primitives-per-instance, when the final primitive in the element buffer has been processed, and
  continue to process the first trigger starting from the first primitive in the element buffer.

16. A graphics processing system configured to perform the method as set forth in claim 1.

17. A method of manufacturing a graphics processing system as set forth in claim 16, comprising inputting a computer readable integrated circuit dataset description into an integrated circuit manufacturing system, which causes the integrated circuit manufacturing system to be configured to manufacture the graphics processing system.

18. A non-transitory computer readable storage medium having stored thereon computer readable code that causes the method as set forth in claim 1 to be performed when the code is run.

19. A non-transitory computer readable storage medium having stored thereon a computer readable dataset description of a graphics processing system as set forth in claim 16 that, when processed in an integrated circuit manufacturing system, causes the integrated circuit manufacturing system to manufacture an integrated circuit embodying the graphics processing system.

20. An integrated circuit manufacturing system configured to manufacture a graphics processing system as set forth in claim 16.

* * * * *